US008090846B2

(12) United States Patent
Battistello et al.

(10) Patent No.: US 8,090,846 B2
(45) Date of Patent: Jan. 3, 2012

(54) METHOD OF MAKING AN AUDIOVISUAL COMMUNICATIONS NETWORK SECURE

(75) Inventors: Patrick Battistello, Perros-Guirec (FR); Stéphane Gorse, Trebeurden (FR)

(73) Assignee: France Telecom, Paris (FR)

( * ) Notice: Subject to any disclaimer, the term of this patent is extended or adjusted under 35 U.S.C. 154(b) by 496 days.

(21) Appl. No.: 11/885,206

(22) PCT Filed: Feb. 21, 2006

(86) PCT No.: PCT/FR2006/050152
§ 371 (c)(1),
(2), (4) Date: Apr. 30, 2008

(87) PCT Pub. No.: WO2006/090083
PCT Pub. Date: Aug. 31, 2006

(65) Prior Publication Data
US 2008/0201482 A1    Aug. 21, 2008

(30) Foreign Application Priority Data
Feb. 25, 2005 (FR) ...................................... 05 02110

(51) Int. Cl.
*G06F 15/16* (2006.01)
*G06F 17/30* (2006.01)
(52) U.S. Cl. ................................ 709/228; 726/3; 726/27
(58) Field of Classification Search .......... 709/204–205, 709/217–231; 726/3, 12–27
See application file for complete search history.

(56) References Cited

U.S. PATENT DOCUMENTS

| 6,105,054 | A  | * | 8/2000  | Kawashima ................. 709/204 |
| 6,859,448 | B1 |   | 2/2005  | Roy |
| 7,051,369 | B1 | * | 5/2006  | Baba ............................... 726/23 |
| 7,373,379 | B2 | * | 5/2008  | Comstock et al. ............ 709/204 |
| 7,441,429 | B1 | * | 10/2008 | Nucci et al. ..................... 70/229 |
| 2003/0110398 | A1 | * | 6/2003  | Dacier et al. .................. 713/201 |
| 2003/0187924 | A1 | * | 10/2003 | Riddle ......................... 709/204 |
| 2005/0213726 | A1 | * | 9/2005  | Rodman ................... 379/202.01 |

FOREIGN PATENT DOCUMENTS

EP    1 267 242    12/2002

OTHER PUBLICATIONS

N. Hawkins, "Security Within Multimedia Networked Conferencing", Computers and Security, Elsevier Science Publishers, Amsterdam, NL, vol. 18, No. 5, pp. 419-422, 1999.
ITU-T Recommendation H.323, "Packet-based multimedia communications systems", pp. 1-299, Jul. 2003.
ITU-T Recommendation H.225, Version 5, "Call signaling protocols and media stream packetization for packet-based multimedia communication systems", pp. 1-194, Jul. 2003.
ITU-T Recommendation H.235, "Sécurite et cryptage des terminaux multimédias de la série H (terminaux H.323 et autres terminaux de type H.245)", pp. 1-93, Nov. 2000.

* cited by examiner

*Primary Examiner* — Yasin Barqadle
(74) *Attorney, Agent, or Firm* — Cozen O'Connor

(57) ABSTRACT

In an audiovisual communications network, a first endpoint exchanges with a control element messages transmitting parameters registered or to be registered in the control element to enable the first endpoint to communicate with a second endpoint registered with the control element. The communications network is made secure by a method that includes an observation step for detecting whether a set of parameters among the parameters transmitted in a message is inconsistent with a current state of the addressee of said message.

25 Claims, 16 Drawing Sheets

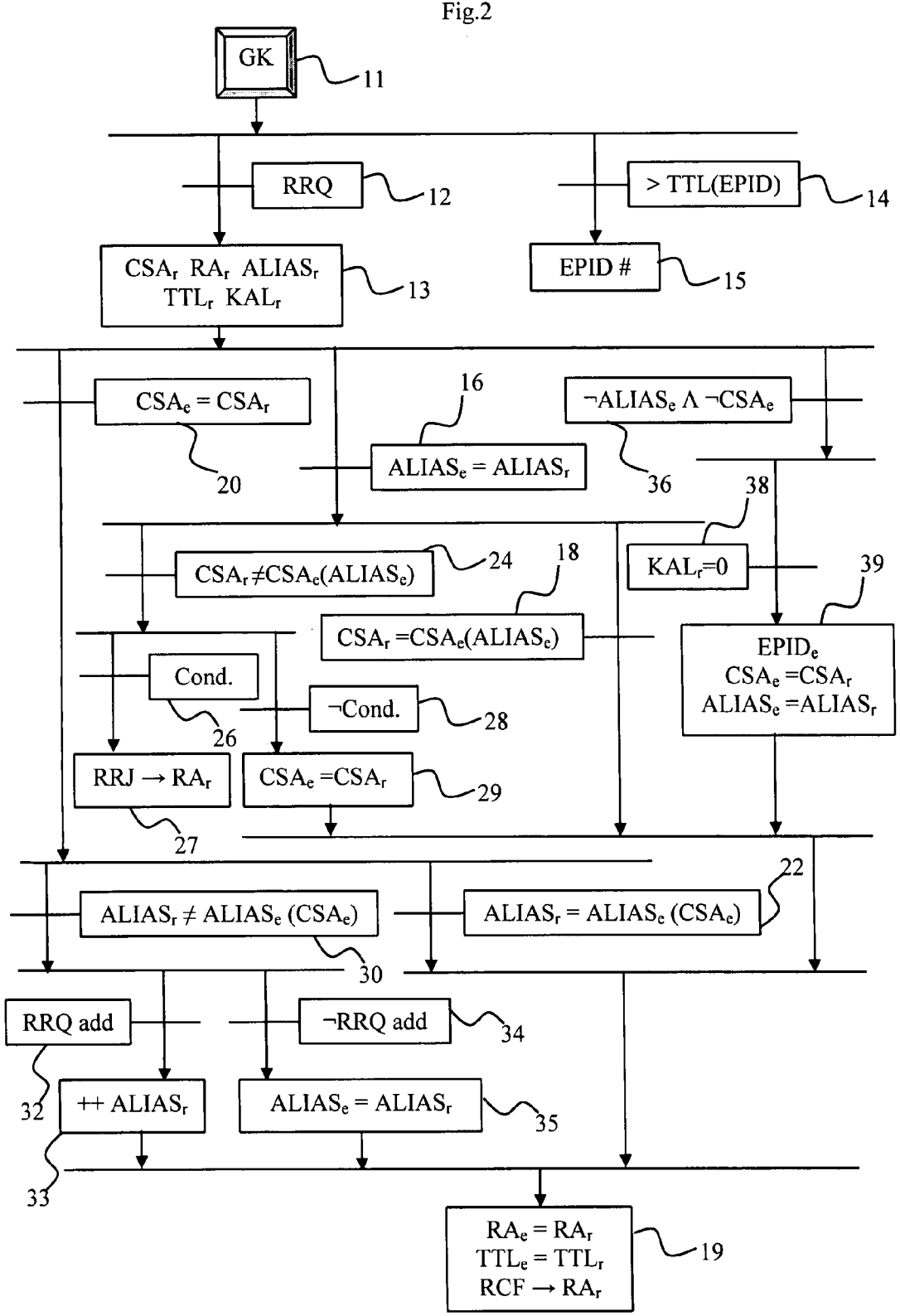

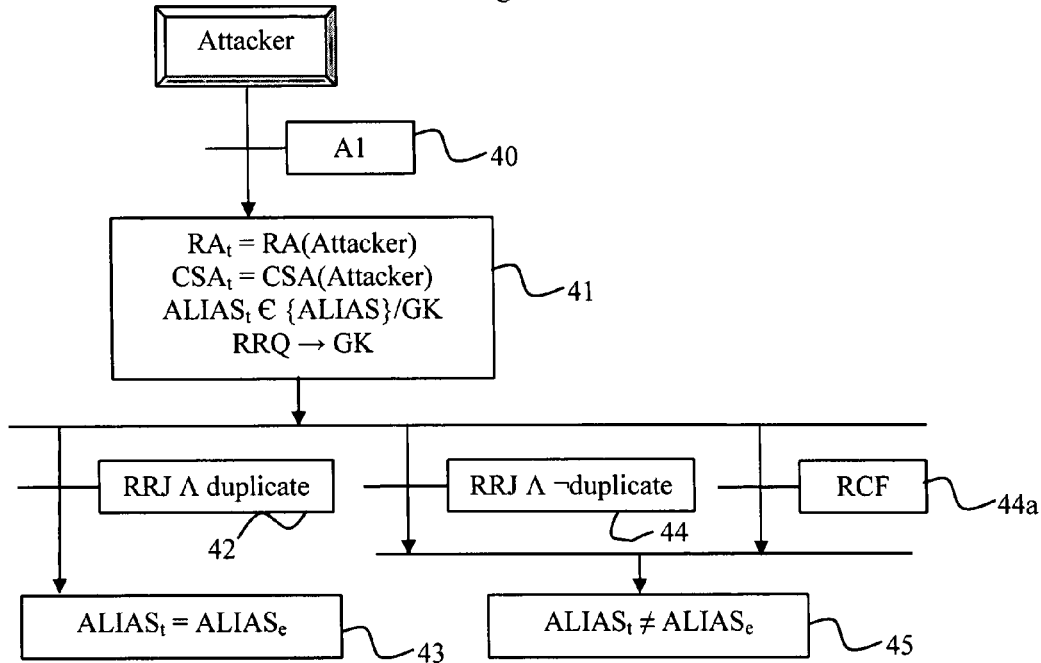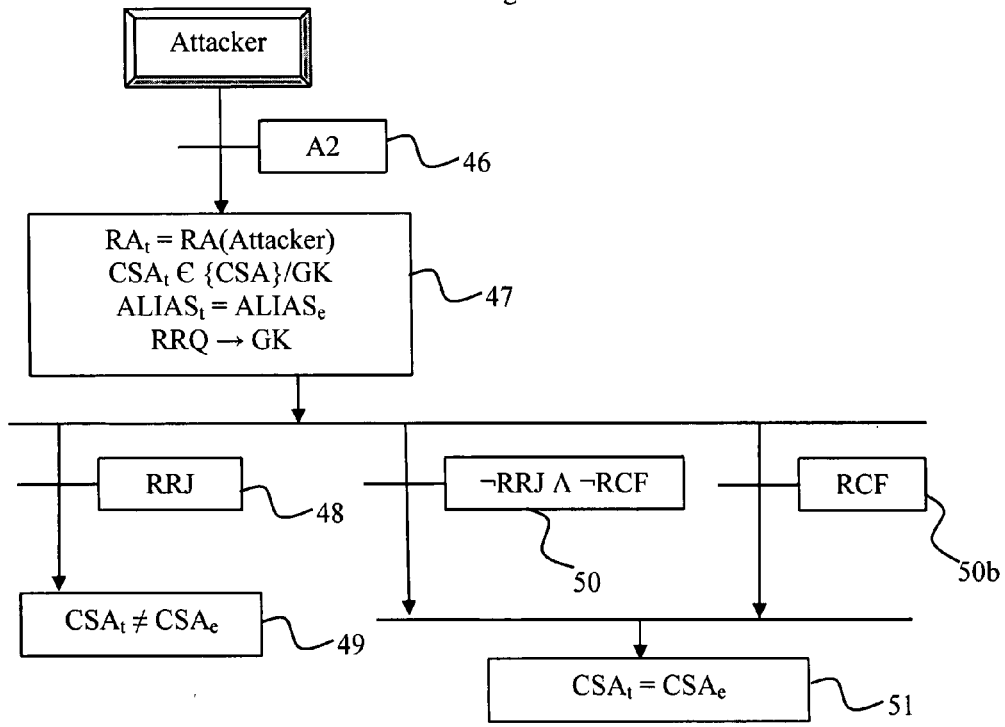

METHOD OF MAKING AN AUDIOVISUAL COMMUNICATIONS NETWORK SECURE

RELATED APPLICATIONS

This is a U.S. National Phase Application under 35 USC 371 of International Application PCT/FR2006/050152 filed on Feb. 21, 2006.

FIELD OF THE INVENTION

The field of the invention is that of audiovisual communications networks and particularly packet transport communications networks which employ packet routing. Such networks are increasingly successful compared to circuit-switched networks, which success can be attributed among other things to the freedom of use and to the flexibility of bandwidth use on offer. The other side of this freedom of open networks is that they are more vulnerable to malicious elements, such vulnerability being encountered more rarely in proprietary type networks.

BACKGROUND OF THE INVENTION

The term "audiovisual communication" is used to mean any multimedia communication using known network architectures and network equipments, such as those based on ITU-T Recommendation H.323 "Packet based multimedia communications systems" and the recommendations derived therefrom, in particular Recommendation H.225 "Call signaling protocols and media stream packetization for packet-based multimedia communications systems" and Recommendation H.235 "Security and encryption for H-series (H.323 and other H.245-based) multimedia terminals".

Recommendation H.323 specifies endpoints such as terminals, gateways, multipoint control units (MCU) and, more generally, any entity capable of generating or receiving calls by processing the associated information streams. Recommendation H.323 further specifies call control elements (gatekeepers) with which endpoints are registered in order to be able to communicate.

Recommendation H.225 defines signaling protocols on which H.323 networks and equipments are based. Messages and protocols defined in recommendation H.225 perform the functions of registering and unregistering endpoints with control elements (gatekeepers), admitting and setting up calls, clearing down calls, locating terminals and requesting information about network elements.

With regard to the security of H.323 systems, Recommendation H.225 focuses on the exchange of signaling between two entities of the H.323 network, but not on the security linked to those messages. Conversely, Recommendation H.235, which focuses on the security of H.323 systems, defines authentication, data integrity, confidentiality, and non-repudiation mechanisms, but does not concern itself with the semantic content of H.225 messages.

Recent events have demonstrated security gaps between those two approaches, and research and laboratory experiments have led to an approach that focuses on the content of H.225 signaling messages and have identified certain sensitive information fields, adopting an approach that can be independent of or complementary to the use of H.235 functions in the elements of the H.323 network. Analysis of these fields and the chaining of signaling messages in the light of the expected behavior of network equipments has uncovered vulnerabilities to which the invention aims to provide a remedy.

SUMMARY OF THE INVENTION

One aspect of the invention is directed to a method of making an audiovisual communications network secure, in which network a first endpoint exchanges messages with a control element. The messages transmit parameters registered or to be registered with the control element to enable the first endpoint to communicate with a second endpoint registered with the control element. An observation step detects whether a set of parameters among the parameters transmitted in a message is inconsistent with a current state of the addressee of said message.

Especially if the addressee of the message is the control element, the set of parameters is consistent if each parameter of the set does not correspond to any endpoint parameter of identical type and value registered with the control element or if there exists a set including the same number of parameters of respectively identical types and values for a single endpoint already registered with the control element.

Especially if the addressee of the message is the endpoint, the set of parameters is not consistent if a source parameter does not have the same value as the source parameter of the control element with which the endpoint is registered or if a parameter designating the endpoint does not have the same value as the parameter of the same type known to the endpoint.

The method can advantageously include an authorization step of detecting, for a parameter that can be associated with a token:
  when a transmitted token exists, whether the transmitted parameter is not of identical type and value to the type and value of an endpoint attribute accredited by the token; and
  when the transmitted parameter is of an endpoint identifier type, whether the value of the transmitted parameter that can be associated with a token is not in a range of identifier values supplied for the endpoint.

More particularly, the set of parameters that is to be consistent is defined as a function of the nature of the message transmitted (registration, unregistration, location, information, admission, or set-up).

For a message relating to registration, if the message contains a registration validity period parameter, the method advantageously includes an evaluation step of detecting whether said parameter has a value below a predefined threshold.

The method can advantageously further include a surveillance step of detecting whether a confirmation type message received by the addressee is not preceded by a corresponding request type message sent by said addressee.

The method can advantageously further include an inspection step of detecting whether a source address of the message has a value other than a parameter value contained in the message to indicate a transport address to which to send a response to said message.

BRIEF DESCRIPTION OF THE DRAWINGS

FIG. 2 shows control element behaviors for registration messages;

FIGS. 3 to 8 show possible attacks faced with the behaviors shown in FIG. 2;

FIG. 1 shows one example of an H.323 network architecture in order to describe vulnerabilities and associated attacks that have been demonstrated in the laboratory environment.

Figure 1:
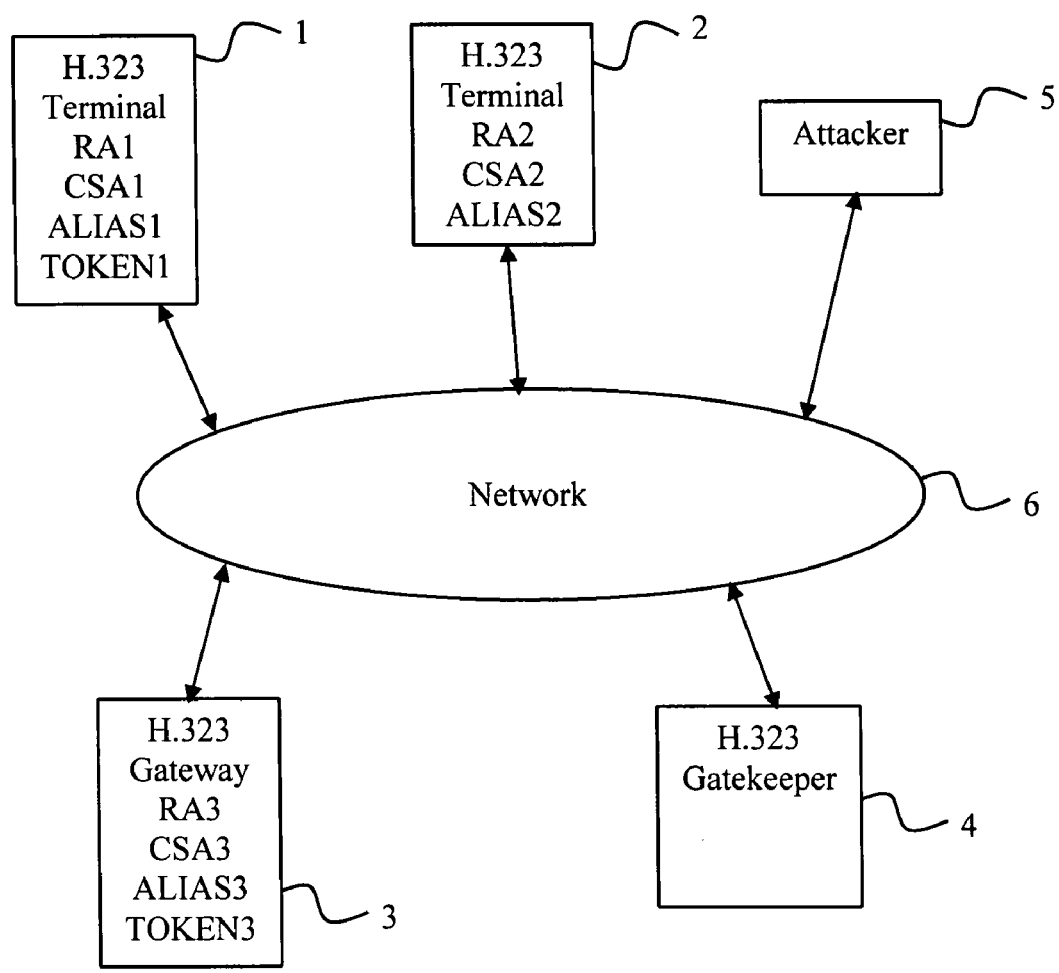
FIG. 1 gives an example of a network architecture to which the invention applies.

A packet transport network 6 is adapted to interconnect H.323 type endpoints such as terminals 1 and 2 and a gateway 3 to constitute an audiovisual communications network such as a Voice over IP (VoIP) network. The gateway 3 connects to the audiovisual communications network terminals adapted to be connected to other networks. This is known in the art. A control element 4 (gatekeeper in the H.323 terminology) is adapted to register endpoints authorized to participate in audiovisual communications. Each endpoint 1, 2, 3 is specified by a respective transport address RA1, RA2, RA3 for its channel RAS, which has three functions: registration, admission and status, a transport address CSA1, CSA2, CSA3 for its call signaling channel CS, and one or more identifiers ALIAS1, ALIAS2, ALIAS3. The channel RAS, which is used in particular for RRQ, URQ, ARQ, LRQ, and IRQ messages, generally uses a non-connected mode transport protocol such as UDP. The channel CS, which is used in particular for "SetUp", "Alerting", "Connect", and "Release Com" messages, generally uses a connected mode transport protocol such as TCP. To strengthen its identification, an endpoint, as represented here by the terminal 1 and the gateway 3, for example, can also be provided with a respective token TOKEN1, TOKEN3 as specified in Recommendation H.235. The network 6 can contain one or more filter elements, not shown, for surveillance of signaling messages exchanged between the endpoints 1, 2, 3 and the control element 4, in accordance with Recommendations H.323, H.225 and H.235.

The method explained below makes the network secure against an attacker 5 simulating an H.323 terminal. It is assumed that the attacker 5 is capable of generating at will signaling messages free of any time constraints in accordance with Recommendations H.323, H.225 and H.235, either with regard to the format or with regard to the information fields used. The attacker 5 can set the information fields of the signaling messages to the values necessary to mount an attack and can get the signaling messages that it generates to the control element 4, where necessary bypassing filter entities deployed in the transport network. The means employed by the attacker 5 to circumvent the filter entities of the network are outside the scope of the invention. The attacker knows at least one range of identifiers (ALIAS) and one range of transport addresses in which the endpoints are registered. In the most usual circumstances, this means the identifiers of a range of telephone numbers or a range of IP addresses in which the endpoints are registered. The method by which the attacker obtains this information is outside the scope of the invention.

On the basis of these hypotheses and the behaviors described below, research and laboratory experiments have demonstrated the feasibility of attacks for at least one H.323 network element.

FIG. 2 shows one example of the transitions and steps of a H.323 control element (gatekeeper) exclusively with the aim illustrating behaviors conforming to Recommendations H.323, H.225 and H.235 for Registration ReQuest (RRQ) messages, Registration ConFirm (RCF) messages, and Registration ReJect (RRJ) messages.

Registration is the process whereby an endpoint informs the control element of its transport addresses and the identifier(s) (ALIAS) associated with those addresses. A behavior C1 of the control element is illustrated by a transition 12 validated by reception of an RRQ message deemed to come from the endpoint. In a step 13 activated by validation of the transition 12, the control element particularly analyses values $CSA_r$, $RA_r$, $ALIAS_r$, $TTL_r$ and $KAL_r$ received in subsequent fields of the RRQ message. In the RRQ message:

a field CSA (Call Signal Address) is intended to contain a transport address used for the CS (Call Signaling) channel of the endpoint;

a field RA (RAS Address) is intended to contain a transport address for the RAS (Registration Admission Status) channel serving the registration, admission and status functions;

a field ALIAS is intended to contain one or more identifiers of the endpoint such as a telephone number, an e164 identifier, an H.323 identifier, an electronic mail address, etc;

a field TTL (Time To Live) is intended to contain a registration validity period; if the registration period exceeds the validity period, the control element considers that the registration has expired, as illustrated by a transition 14 and a step 15;

a field KAL (Keep ALive) is intended to be set false, for example to 0, if the endpoint considers itself not yet registered with the control element and true, for example to 1, to maintain the registration. Maintenance of registration results from resending of RRQ messages by the endpoint to the control element before the registration validity period expires.

The registration process can be repeated periodically by the endpoint. A behavior C2 of the control element is illustrated by a step 11 in which the control element is listening out at all times for received RRQ messages.

Messages sent to the endpoint on the RAS channel by the control element must be sent to the address indicated by the field RA of the RRQ message and not to the source address AS from which the RRQ message or any other message comes. A behavior C3 of the control element in this regard is illustrated by a step 19 in which the control element sends an RCF message to the address $RA_r$ analyzed in the step 13 after setting the registered values $RA_e$ and $TTL_e$ to the received values $RA_r$ and $TTL_r$ if a value $TTL_r$ is accepted by the control element. The behavior C3 of the control element in this regard is also illustrated by a step 27 in which the control element sends an RRJ message to the address $RA_r$ analyzed in the step 13.

A behavior C4 of the control element consists in responding with an RCF message if the received RRQ message designates the same transport address for the channel CS and the same identifier (ALIAS) as an endpoint already registered with it. The behavior C4 is illustrated by triggering a step 19 after transitions 16, 18 or after transitions 20, 22. The transition 16 is validated if the control element discovers a registration containing a value $ALIAS_e$ equal to the received value $ALIAS_r$. The transition 18 is validated if the control element finds that the received value $CSA_r$ is equal to a registered value $CSA_e$ in the same registration as that containing the value $ALIAS_e$. The transition 20 is validated if the control element discovers a registration containing a value $CSA_e$ equal to the received value $CSA_r$. The transition 22 is validated if the control element finds that the received value $ALIAS_r$ is equal to a registered value $ALIAS_e$ in the same registration as that containing the value $CSA_e$.

In a behavior C5, if the control element receives an RRQ message having at least one alias that designates an endpoint already registered with it, but for which the transport address on the signaling channel contained in the RRQ message does not correspond to that endpoint, the control element can confirm the request or send back an RRJ message indicating a duplicated alias. The behavior C5 is illustrated by triggering the step 27 following transitions 16, 24 on validation of a transition 26 or triggering the step 19 following validation of a transition 28. The transition 16 is validated if the control element discovers a registration containing a value $ALIAS_e$ equal to the received value $ALIAS_r$. The transition 24 is validated if the control element finds that the received value $CSA_r$ is different from the registered value $CSA_e$ in the same registration as that containing the value $ALIAS_e$. The transition 26 is validated on condition that the control element refuses any received value $CSA_r$ for a registration containing a different value $CSA_e$. The transition 28 is validated in the absence of any such condition, for example to enable migration, in a step 29, by replacing the registered value $CSA_e$ by the received value $CSA_r$ before activation of the step 19.

In a behavior C6, if the control element receives an RRQ message for which the transport address on the signaling channel ($CSA_r$) designates an endpoint already registered with it but the identifier ($ALIAS_r$) contained in the RRQ message does not correspond to that endpoint, then the identifier specified in the RRQ message must replace the one previously registered for that endpoint. This behavior applies only when the RRQ message is not additive. The behavior C6 is illustrated by triggering a step 33 after transitions 20, 30 on validation of a transition 32 or triggering a step 35 on validation of a transition 34. The transition 30 is validated if the control element discovers a registration containing a value $ALIAS_e$ different from the received value $ALIAS_r$. The transition 32 is validated if the RRQ message is additive. The transition 34 is validated if the RRQ message is not additive. In the step 33 the received value $ALIAS_r$ is added to the list of registered values $ALIAS_e$. In the step 35 the received value $ALIAS_r$ replaces the registered value $ALIAS_e$.

An endpoint can send an RRQ message specifying a validity period value TTL (Time To Live). After reception of the RCF message, and when the TTL has expired, a behavior C7 of the control element considers that the registration of the endpoint has expired and unregisters it. The behavior C7 is illustrated by triggering the step 15 after the transition 14 validated by each time-out TTL assigned to a registration identified by a key EPID (endpoint identifier). In the step 15, the whole of the identified registration is eliminated, which generally causes a URQ message to be sent to the endpoint, which is then constrained to acknowledge the unregistration request. Note that the validity period TTL can also be fixed at the initiative of the control element and that the control element can refuse a TTL value requested by the endpoint.

In a behavior C8, a first endpoint registration is effected by setting the field KAL (Keep ALive) false and registration maintenance requests are effected by setting the field KAL true. The behavior C8 is illustrated by a transition 38 validated when the value $KAL_r$ received in the RRQ message is set false. The transition 38 activates a step 39 in which the control element generates a value $EPID_e$ for identifying a new registration for storing the received values $CSA_r$ and $ALIAS_r$, normally detected as absent from any preceding registration by validation of a transition 36. The transition 36 is typically validated when there are no registered values $ALIAS_e$ and $CSA_e$ respectively equal to the received values $ALIAS_r$ and $CSA_r$. The identity key EPID is used thereafter by the endpoint to identify a preceding registration with the control element, particularly when the field KAL is set true. The registration is confirmed at the endpoint by sending an RCF message in step 19 in which the registered value $RA_e$ and where appropriate the registered value $TTL_e$ are respectively set to values equal to the values $RA_r$ and $TTL_r$ received in the RRQ message.

The behaviors C1 to C8 are vulnerable to attacks like those illustrated by FIGS. 3 to 8.

Referring to FIG. 3, a transition 40 is validated if an attacker decides to mount an attack A1 aiming to discover the aliases of endpoints registered with the control element. In a step 41 activated by validation of the transition 40, the attacker sends to the control element GK (gatekeeper) an RRQ message in which the field RA contains a value $RA_t$ equal to the address RA(Attacker) of the channel RAS of the attacker, the field CSA contains a value $CSA_t$ equal to the address CSA(Attacker) of the channel CS of the attacker, and the field ALIAS contains a value $ALIAS_t$ that belongs to the range of aliases managed by the control element GK. In accordance with the behaviors C3 and C5, the attacker receives in return an RRJ or RCF message. Reception of an RRJ message with the cause "DuplicateAlias", meaning that the alias is already registered with the control element, validates a transition 42 that activates a step 43 in which the attacker finds that the value $ALIAS_t$ is equal to a registered endpoint alias value. The reception of an RCF message validating a transition 44a or an RRJ message with a cause other than "DuplicateAlias" validating a transition 44 activates a step 45 in which the attacker finds that the alias transmitted was not registered with the control element. Accordingly, by sending successive RRQ messages that scan the whole range of aliases, the attacker discovers the aliases of the endpoints registered with the control element. Note that the transition 42 can also be validated by the absence of messages received from the control element, for example on a time-out. In fact, if the control element sends an RCF message to the regular endpoint, that message can be interpreted in the step 43 as indicating the existence of a registered identifier value $ALIAS_e$ equal to the transmitted value $ALIAS_t$. The attacker can send RRQ messages at a sufficiently low frequency for them to be swamped in the regular stream of messages received by the control element. To make the attack more furtive, the target range of aliases can be scanned at random.

Referring to FIG. 4, a transition 46 is validated if an attacker decides to mount an attack A2 aiming to discover the address of an endpoint whose alias the attacker knows. To mount the attack A2, the attacker previously discovers the alias of at least one registered endpoint, for example by means of the attack A1. In a step 47 activated following the transition 46, the attacker sends to the control element GK (gatekeeper) an RRQ message in which the field RA contains a value $RA_t$ equal to the address RA(Attacker) of the channel RAS of the attacker and the field CSA contains a value $CSA_t$ in the range of addresses for the signaling channel managed by the control element GK. The field ALIAS contains a value $ALIAS_t$ equal to the known value $ALIAS_e$ of a registered endpoint. In the behaviors C3, C4 and C5, the attacker receives in return an RRJ message validating a transition 48 or an RCF message validating a transition 50b. The transition 48 activates a step 49 in which the attacker discovers that the address placed in the field CSA is not that of the registered endpoint and the search process is repeated with a new address from the range of signaling channel addresses managed by the control element. The transition 50b activates a step 51 in which the attacker discovers that the address placed in the field CSA is indeed that of the registered endpoint and marks the end of the search process. If the behavior of the control element does not conform to the behavior C3, it may be that the RCF message was sent to the registered endpoint and the attacker terminal received no message in response to the RCF message. This absence of response validating a transition 50 is similar to reception of an RCF message that has the effect of activating the step 51. Thus at the end of the attack, the attacker knows the transport address for the channel CS corresponding to the alias of the registered endpoint. When an RCF message is received, the attacker further acquires knowledge of the identity key $EPID_e$ of the registered endpoint. As for the attack A1, the attacker can send RRQ messages at a frequency that is sufficiently low for them to be swamped in the regular stream of messages received by the control element and the targeted range of addresses can be scanned at random.

Figure 5:
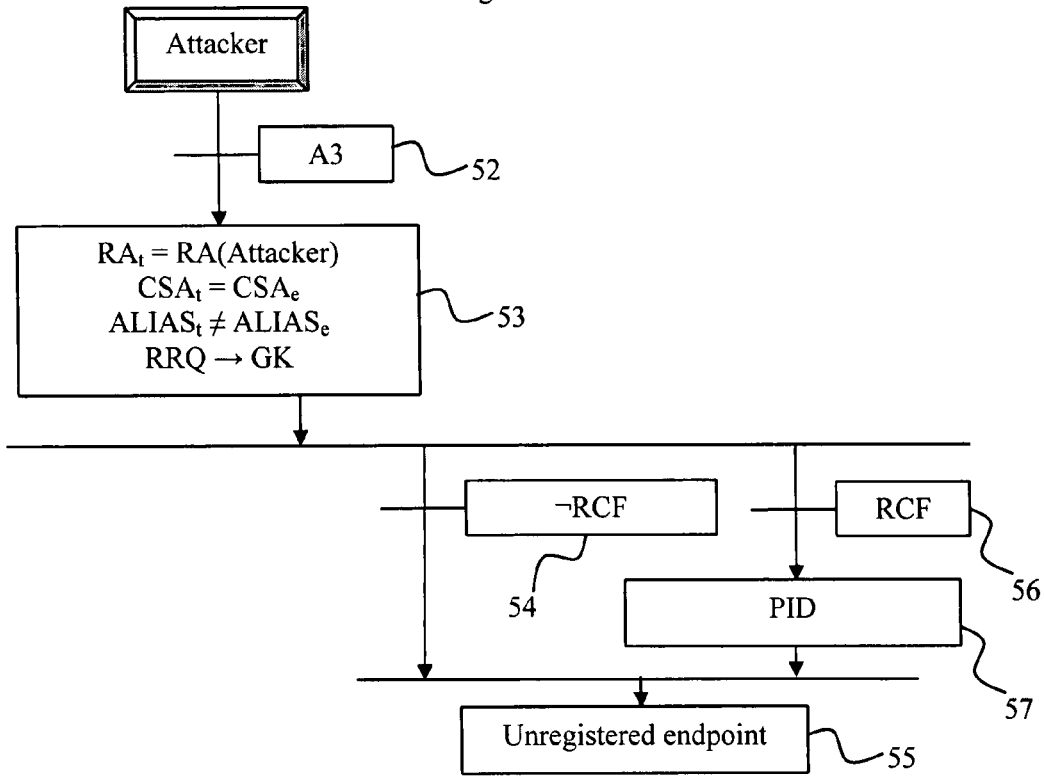

Referring to FIG. 5, a transition 52 is validated if an attacker decides to mount an attack A3 aiming to unregister a regular endpoint of the control element in a first way. To mount the attack A3, the attacker obtains beforehand a knowledge of the alias and the transport address of the signaling channel CS of at least one registered endpoint, for example by means of the attacks A1 and A2. In a step 53 activated following the transition 52, the attacker sends the control element GK (gatekeeper) a non-additive RRQ message in which the field RA contains a value $RA_t$ equal to the address RA(Attacker) of the channel RAS of the attacker, the field CSA contains a value $CSA_t$ equal to the value $CSA_e$ that the attacker knows for a registered endpoint, and the field ALIAS contains either a value $ALIAS_t$ equal to an alias value not registered with the control element or no identifier value if the control element accepts RRQ messages with an empty field ALIAS. In the behaviors C3 and C6, the attacker receives an RCF message confirming registration and indicating that the new alias given by the attacker in the RRQ message has replaced the alias of the regular endpoint. The RCF message, also containing the new key value EPID for that registration, validates a transition 56 that activates a step 57 enabling the attacker to interfere at will with the registration. If the behavior of the control element does not conform to the behavior C3, the RCF message is not received by the attacker but the result is the same from the point of view of the attack, namely that indicated in the step 55 validated equally by a transition 54 as by the transition 56: the alias and the value of the key EPID that the regular endpoint holds are no longer valid and the regular endpoint must be reregistered.

Figure 7:
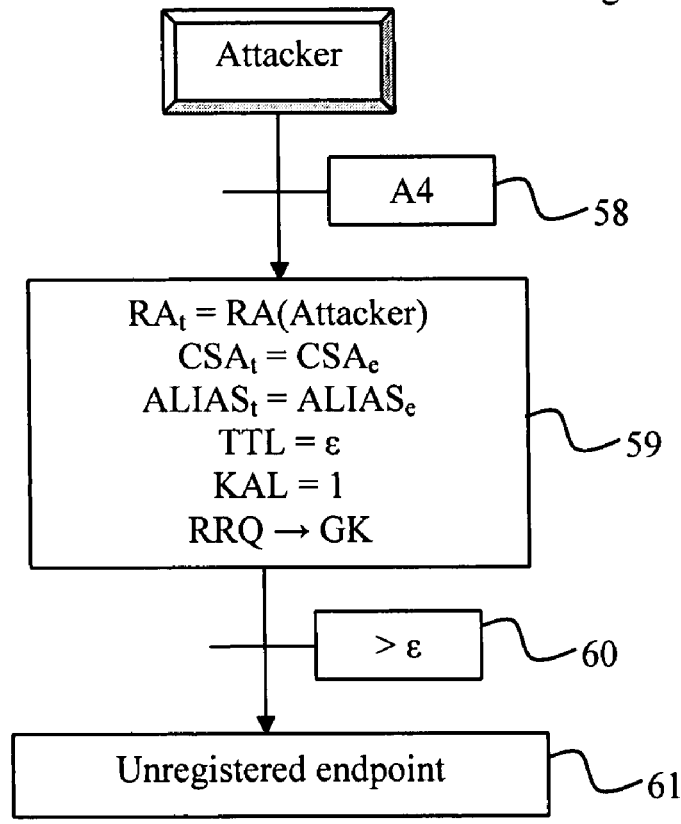

Referring to FIG. 7, a transition 58 is validated if an attacker decides to mount an attack A4 aiming to unregister a regular endpoint of the control element in a second way. To mount the attack A4, the attacker finds out beforehand the alias and the transport address of the signaling channel of at least one registered endpoint, for example by means of the attacks A1 and A2. In a step 59 activated following the transition 58, the attacker sends the control element GK (gatekeeper) an RRQ message in which the field RA contains a value $RA_t$ equal to the address RA(Attacker) of the channel RAS of the attacker, the field CSA contains a value $CSA_t$ equal to the value $CSA_e$, and the field ALIAS contains a value $ALIAS_t$ equal to the alias value $ALAS_e$ that the attacker knows for an endpoint registered with the control element. Moreover, the field TTL in the RRQ message is set to a low time-out value ϵ, typically less than the normal duration of registration in the system, and the field KAL is set true to indicate maintaining of the registration. In the behaviors C2, C4, C7 and C8, the control element accepts this request to maintain the registration and considers the endpoint unregistered on expiry of the time-out ϵ. Independently of reception or non-reception of any RCF message, depending on whether the control element conforms to the behavior C3 or not, the attacker knows that on expiry of the time-out ϵ validating a transition 60, the regular endpoint is automatically unregistered by the control element. In parallel with the activation of a step 61 following the transition 60, the control element generally sends an Unregistration ReQuest (URQ) message to the regular endpoint. Following the attack the regular endpoint must be reregistered.

Figure 8:
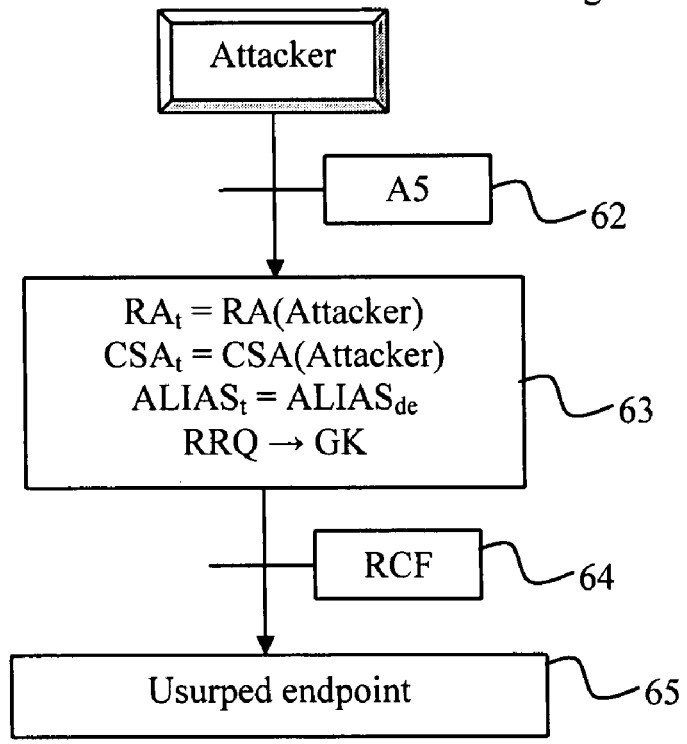

Referring to FIG. 8, a transition 62 is validated if an attacker decides to mount an attack A5 aiming to steal the identity of a regular endpoint. A preliminary first phase consists in determining the parameters ALIAS and CSA of a regular endpoint using the methods described in relation to the attacks A1 and A2 or any other method leading to an identical result. A second phase preceding the attack A5 provokes temporary unregistration of the regular endpoint by applying the methods described with reference to the attacks A3 or A4 or any other method leading to an identical result. By temporary is meant the fact that unregistration is in fact maintained only until the regular endpoint is reregistered. In a step 63 activated following the transition 62, the attacker sends the control element GK an RRQ message in which the field RA contains a value $RA_t$ equal to the address RA(Attacker) of the channel RAS of the attacker, the field CSA contains a value $CSA_t$ equal to the value of the transport address CSA(Attacker) of the attacker, and the field ALIAS contains a value $ALIAS_t$ equal to the identifier value $ALIAS_e$ of the endpoint whose identity the attacker is seeking to steal. A transition 64 validated by reception of an RCF message activates a step 65 that tells the attacker that he is now registered with the control element under the alias of the regular endpoint. The regular endpoint can therefore no longer register, since its identifying alias is now assigned to the attacker terminal. The attacker terminal can then send or receive calls in place of the regular endpoint.

Figure 6:
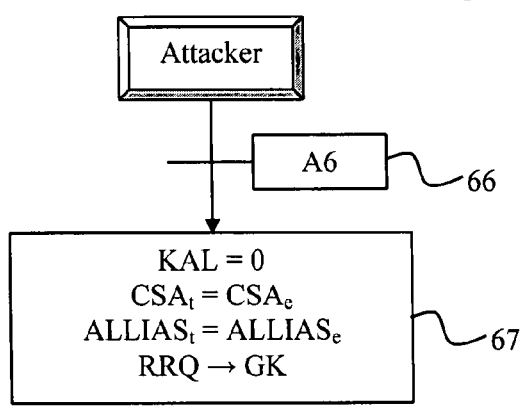

Referring to FIG. 6, a transition 66 is validated if an attacker decides to mount an attack A6 aiming to create a lack of synchronization between the states of a control element and an endpoint. This attack applies particularly to H.323 networks in which endpoints maintain registrations by periodically sending RRQ messages. A preliminary first phase determines the parameters ALIAS and CSA of a regular endpoint by applying the method described with reference to the attacks A1 and A2 or any other method leading to an identical result. A second phase preceding the attack consists in provoking temporary unregistration of the regular endpoint by applying the method described with reference to the attack A4 or any other method leading to an identical result. In a step 67 activated following the transition 66, the attacker sends a new RRQ message in which the fields ALIAS and CSA contain the values $ALIAS_e$ and $CSA_e$ of the regular endpoint and the field KAL is set false to indicate that this is a new registration. In the behavior C4, the control element accepts this new registration and sends an RCF message back to the regular endpoint or to the attacker, as a function of how the field RA in the RRQ message is set and the conformance of the control element to the behavior C3. If the regular endpoint attempts to reregister, its action fails because it has already been reregistered by the attacker. Thus the attacker performs an unregistration of the regular endpoint followed by its reregistration before the regular endpoint can do so for itself. As a result of this the control element is in a state in which it is awaiting RRQ messages from the regular endpoint with a true value for KAL, since it has already received the RRQ message sent by the attacker with a false value for KAL. The regular endpoint attempts to reregister by sending RRQ messages with a false value for KAL, and therefore fails to reregister.

Figure 9:
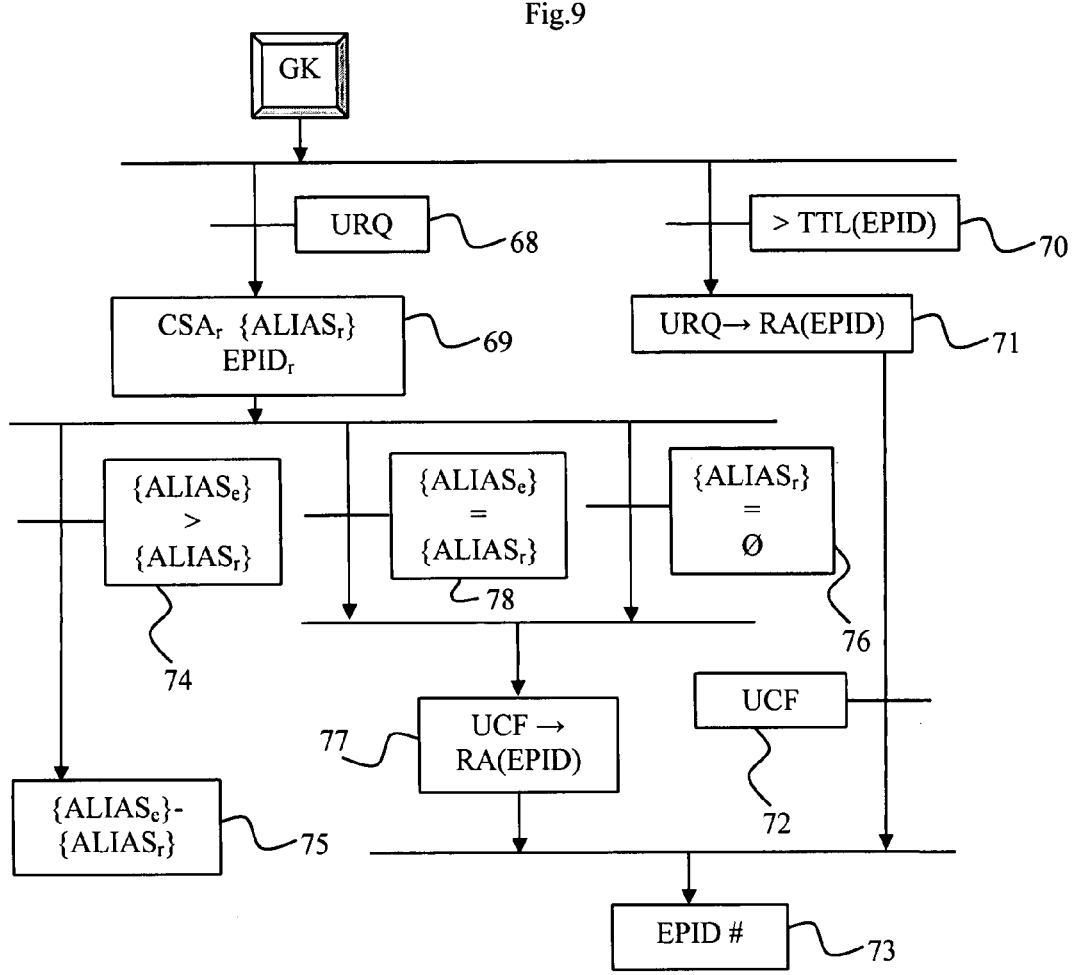
FIG. 9 shows control element behaviors for unregistration messages.

FIG. 9 shows one example of transitions and steps of an H.323 control element (gatekeeper) exclusively to illustrate behaviors conforming to Recommendations H.323, H.225 and H.235 for Unregistration ReQuest (URQ) messages, Unregistration ConFirm (UCF) messages, and Unregistration ReJect (URJ) messages.

An endpoint can send an URQ message to the control element at any time in order to unregister from that control element. A behavior C9 of the control element is illustrated by a transition 68 validated by reception of a URQ message deemed to come from the endpoint. In a step 69 activated by validation of the transition 68, the control element analyses in particular received values $CSA_r$, $\{ALIAS_r\}$, and $EPID_r$ in the corresponding fields of the URQ message.

In a behavior C10, the endpoint can unregister an endpoint at any time, for example on expiry of the time to live TTL of the registration identified by the key EPID, as illustrated by a transition 70 that activates a step 71 in which a URQ message is sent to the transport address RA contained in the registration EPID. The endpoint is constrained to accept its unregistration by the control element and must respond with a UCF message like that which validates a transition 72 to activate a step 73 which unregisters the registration identified by the key EPID.

If an endpoint sends a control element a URQ message containing a list of fields $\{ALIAS_r\}$ and the control element accepts the unregistration request, it must unregister only the identifiers specified in the URQ message. This behavior C11 is illustrated by a transition 74 that activates a step 75 in which the identifiers from the list $\{ALIAS_r\}$ are withdrawn from the list $\{ALIAS_e\}$ of identifiers registered for the endpoint concerned and a UCF message is sent to that endpoint. Equality of the two lists validates a transition 78 that activates a step 77 in which a UCF message is sent to the transport address RA contained in the registration identified by the key EPID.

If an endpoint sends the control element a URQ message that contains no ALIAS fields and does not contain the fields endpointAliasPattern and supportedPrefixes defined in the H.225 standard, the control element must unregister all aliases relating to that endpoint. This behavior C12 is illustrated by a transition 76 that activates the step 77. The step 73 then activated with the step 77 following validation of the transition 76 or the transition 78 has the effect of unregistering the endpoint.

Similarly, if the control element sends an endpoint a URQ message containing no alias field, a behavior C13 unregisters all the aliases identifying that endpoint and therefore the endpoint itself.

If a control element sends an endpoint a URQ message, a behavior C14 dispenses the control element from completing the field EPID (endpointidentifier) of the URQ message.

Figure 10:
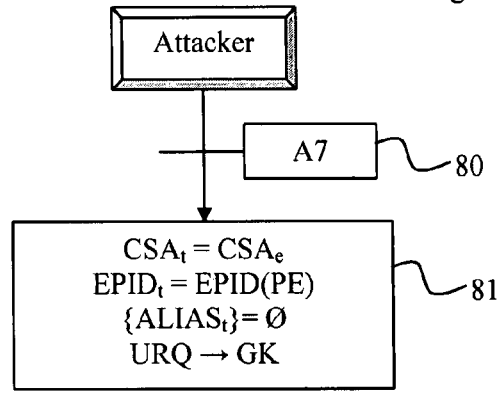
FIGS. 10 and 11 show possible attacks faced with the behaviors shown in FIG. 9.
Figure 11:
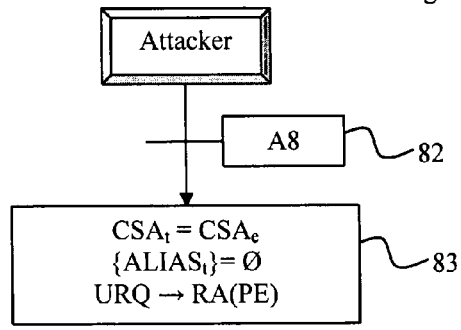

The behaviors C9 to C14 are vulnerable to attacks such as those illustrated by FIGS. 10 and 11.

Referring to FIG. 10, a transition 80 is validated if an attacker decides to mount an attack A7 aiming to unregister an endpoint with the control element in a first way. In a phase preliminary to the attack A7, the attacker has discovered values of the transport address CSA for the channel CS and the parameter EPID of the endpoint that it wishes to unregister. This knowledge can be acquired by mounting one of the attacks A1 to A6 beforehand or by any other method leading to an identical result. The transition 80 activates the step 81 in which the attacker sends the control element GK a URQ message in which the values of the parameters $CSA_r$ and $EPID_r$ are equal to the values $CSA_e$ and EPID(PE) determined previously and that contains no ALIAS field. In the behaviors C9 and C12, the control element accepts the unregistration request and sends a UCF message to the endpoint designated by the parameters CSA and EPID. Note that, because of the behavior C12, the attacker does not need to complete the field ALIAS of the URQ message. The result is that the endpoint is temporarily unregistered from the control element. This result is similar to that of the attacks A3 and A4 and may be followed by an identity theft attack before the regular terminal has had time to reregister.

Referring to FIG. 11, a transition 82 is validated if an attacker decides to mount an attack A8 aiming to unregister an endpoint in a second way. In a phase preliminary to the attack A8, the attacker has discovered values of the transport address CSA for the channel CS and the transport address RA for the channel RAS of the endpoint that it wishes to unregister. This knowledge can be acquired by mounting one of the attacks A1 to A6 beforehand or by any other method leading to an identical result. The transition 82 activates the step 83 in which the attacker sends the endpoint (PE) a URQ message containing no ALIAS field and no EPID field and in which the parameter CSA has instead of the value $CSA_r$ the value $CSA_e$ previously determined. In the behaviors C10, C13 and C14, the endpoint accepts the unregistration request and sends a UCF message to the control element with which it was registered. In fact, the behaviors C13 and C14 dispense the attacker from completing the fields ALIAS and EPID of the URQ message. The result is that the endpoint is unregistered and must submit a new registration request to the control element. If this attack is repeated to a large number of endpoints in a very short time period, it generates a flood of messages to the control element GK that can cause it to be taken out of service. Moreover, depending on how the control element works, the attack A8 can create a state of desynchronization between the endpoint and the control element, since the control element receives a new registration request from an endpoint that it considers to be already registered.

Figure 12:
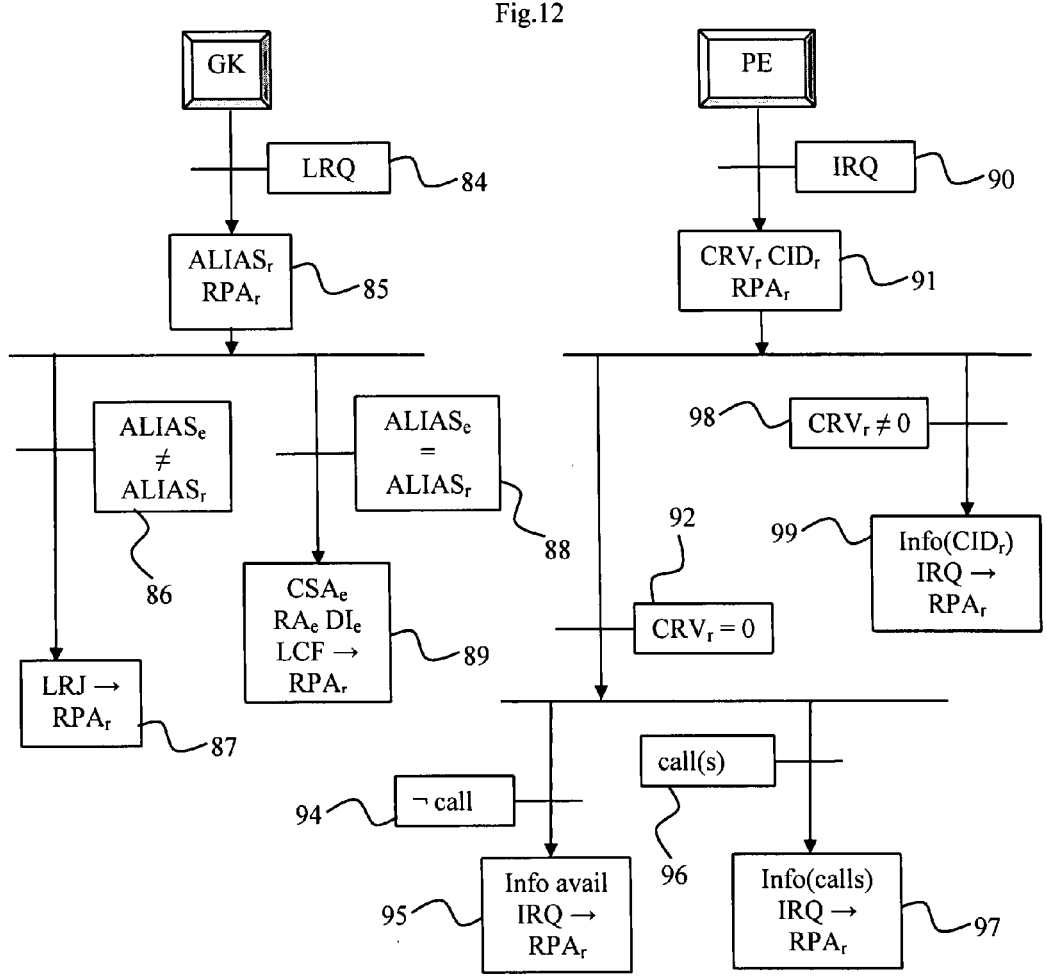
FIG. 12 shows control element behaviors for location or information messages.

FIG. 12 shows one example of transitions and steps for an H.323 control element (gatekeeper) and an H.323 endpoint exclusively to illustrate behaviors conforming to Recommendations H.323, H.225 and H.235 for Location ReQuest (LRQ) messages, Location ConFirm (LCF) messages, and Location ReJect (LRJ) messages, as well as Information ReQuest (IRQ) messages and Information Request Response (IRR) messages.

An endpoint or a control element can send a control element an LRQ message at any time in order to obtain the location information of a third party endpoint for which it knows at least one alias. The location information sent back by the control element includes in particular values of the parameters CSA, RA and DI. The field DI is intended to contain one or more destination endpoint identifiers of an audiovisual call, for example a telephone number, an e164 identifier, a H.323 identifier, an electronic mail address, etc. A control element behavior C15 is illustrated by a transition 84 validated by reception of an LRQ message deemed to come from a regular endpoint or another regular control element. In a step 85 activated by validation of the transition 84, the control element analyses received values ALIAS$_r$ and particularly RPA$_r$ in an RPA (RePly Address) field of the LRQ message that is intended to contain an entity network address to which a response to the LRQ message or to an IRQ message must be sent. In a step 89 activated by validation of a transition 88 following the step 85, the control element sends to the address RPA$_r$ an LCF message containing values CSA$_e$, RA$_e$ and DI$_e$ registered for the endpoint recognized by its identifier ALIAS$_e$ equal to the received value ALIAS$_r$ at the time of validation of the transition 88. The value DI$_e$ is transmitted in the parameter field DI (Destination Info) for an LRQ or ARQ message seen subsequently or DA (Destination Address) for a call set-up message (see below).

A control element receiving an LRQ message designating an endpoint that is not registered with it must respond by sending an LRJ message if the LRQ message was received on the channel RAS of the control element. This behavior C16 is illustrated by the transition 86 that activates a step 87 for sending the LRJ message. The transition 86 is validated if no registered identifier value ALIAS$_e$ corresponds to the received value ALIAS$_r$, for example.

A behavior C17 of a control element receiving an LRQ message consists in responding to the network address designated by the parameter RPA of the LRQ message, whether that response is an LCF or LRJ message.

In a behavior C18, a control element can request endpoint usage information at any time by sending the endpoint an IRQ message that specifies in the fields CRV and CID values corresponding to a call that it is looking for. The field CRV (Call Reference Value) is intended to contain a call reference and the field CID (Call IDentifier) is intended to contain a call identifier. For more details, see the H.323 and H.225 standards. Reception of an IRQ message by an endpoint validates therein a transition 90 that activates a step 91 in which the endpoint learns the values CRV$_r$, CID$_r$ and RPA$_r$ received in the IRQ message.

If a control element adopts a behavior C19 to discover usage information relating to an endpoint for all calls in progress, it suffices for it to set the field CRV to 0. Under such circumstances, the value of the field CID is meaningless and it may also be set to 0. The 0 value of CRV$_r$ then validates a transition 92 in the endpoint. A transition 96 validated by each presence of a call in progress then activates a step 97 in which the endpoint supplies the information relating to the call in progress.

If an endpoint receives an IRQ message with the field CRV set to 0 when the absence of any call in progress validates a transition 94, the endpoint must adopt a behavior C20 that responds to the IRQ message by supplying, in a step 95, all the other information that it has apart from the call information. If an endpoint receives an IRQ message with the field CRV set to a non-zero value that validates a transition 98, the endpoint responds to the IRQ message by supplying, in a step 99, the information that it holds relating to the call identified by the received value CID$_r$.

Steps 95 and 97 also highlight a behavior C21 whereby an endpoint receiving an IRQ message must send a response to the network address designated by the RPA parameter of the IRQ message and not to the source address (AS) of the IRQ packet.

Figure 13:
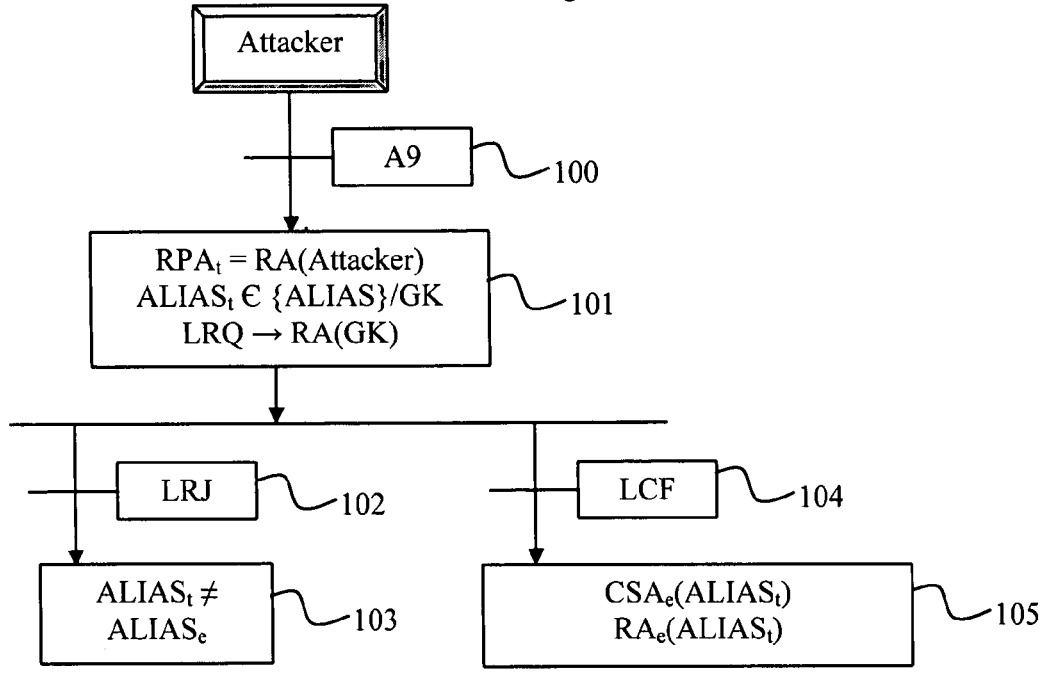
FIGS. 13 and 14 show possible attacks faced with the behaviors shown in FIG. 12.

Referring to FIG. 13, a transition 100 is validated if an attacker decides to mount an attack A9 aiming to recover information on endpoints stored by the control element. The transition 100 activates a step 101 in which the attacker sends an LRQ message to the control element with the field DI set to an alias value ALIAS$_t$ contained in the range of aliases {ALIAS} managed by the control element GK and the field RPA designates the address RA$_a$ of the attacker. In the behaviors C15, C16 and C17, the attacker receives in return an LRJ message that validates a transition 102 or an LCF message that validates a transition 104. The reception of an LRJ message in a step 103 signifies that the alias concerned is not registered with the control element. The reception of an LCF message in a step 105 indicates that that alias is registered with the control element and additionally supplies sensitive information on the endpoint, such as the values of parameters CSA$_e$, RA$_e$. By sending successive LRQ messages to scan all the range of aliases, the attacker can discover the endpoints registered with the control element and associated registration information. The result of the attack is very similar to that of the attacks A1 and A2 except that, in contrast to the RCF message, the LCF message does not contain any information of EPID type. It should be noted that the source address (AS) for sending the LRQ packet can be that of the attacker itself or that of an H.323 entity from which the control element would accept an LRQ message. This option assumes that the attacker knows how to circumvent the network filtering entities and thus succeeds in stealing the identity of a regular entity on sending the LRQ message.

Figure 14:
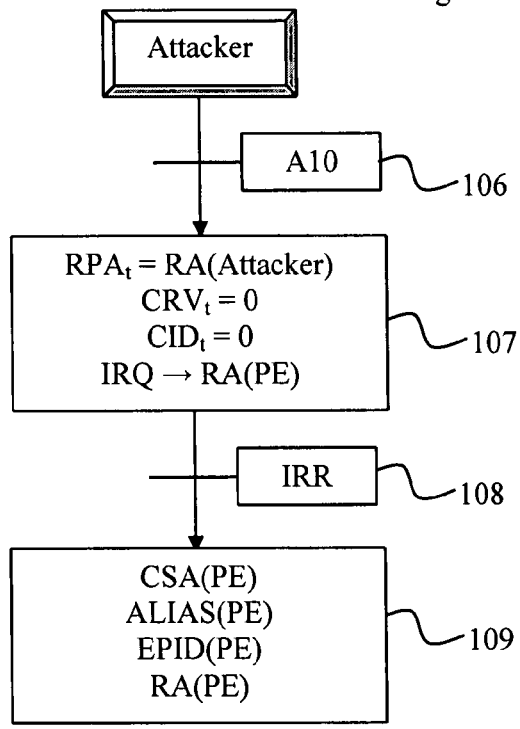

Referring to FIG. 14, a transition 106 is validated if an attacker decides to mount an attack A10 aiming to recover endpoint usage information. The transition 106 activates a step 107 in which the attacker sends an IRQ message to the endpoint PE targeted by its address in the field RA, with the fields CRV and CID set to 0 and the field RPA designating the address of the attacker. In the behaviors C18 and C19, the endpoint must accept the IRQ message. If there is a call in progress, or even if there is no call in progress in the behavior C20, the endpoint must respond to this IRQ message by sending an IRR message to the address specified in the field RPA in the behavior C21, i.e. to the attacker. Following the reception of the IRR message validating a transition 108, the attacker knows sensitive information on the endpoint, such as the parameters CSA(PE), RA(PE), ALIAS(PE) and EPID (PE). The result of the attack A10 is very similar to that of the attacks A1 and A2 and the attack A10 can moreover be repeated to all the endpoints registered with the control element. It should be noted that the source address (AS) for sending the IRQ packet can be that of the attacker itself or that of an H.323 entity from which the endpoint would accept an IRQ message, typically the control element with which the endpoint is registered. This option assumes that the attacker knows how to circumvent the network filtering entities and therefore succeeds in stealing the identity of the control element on sending the IRQ message.

Figure 15:
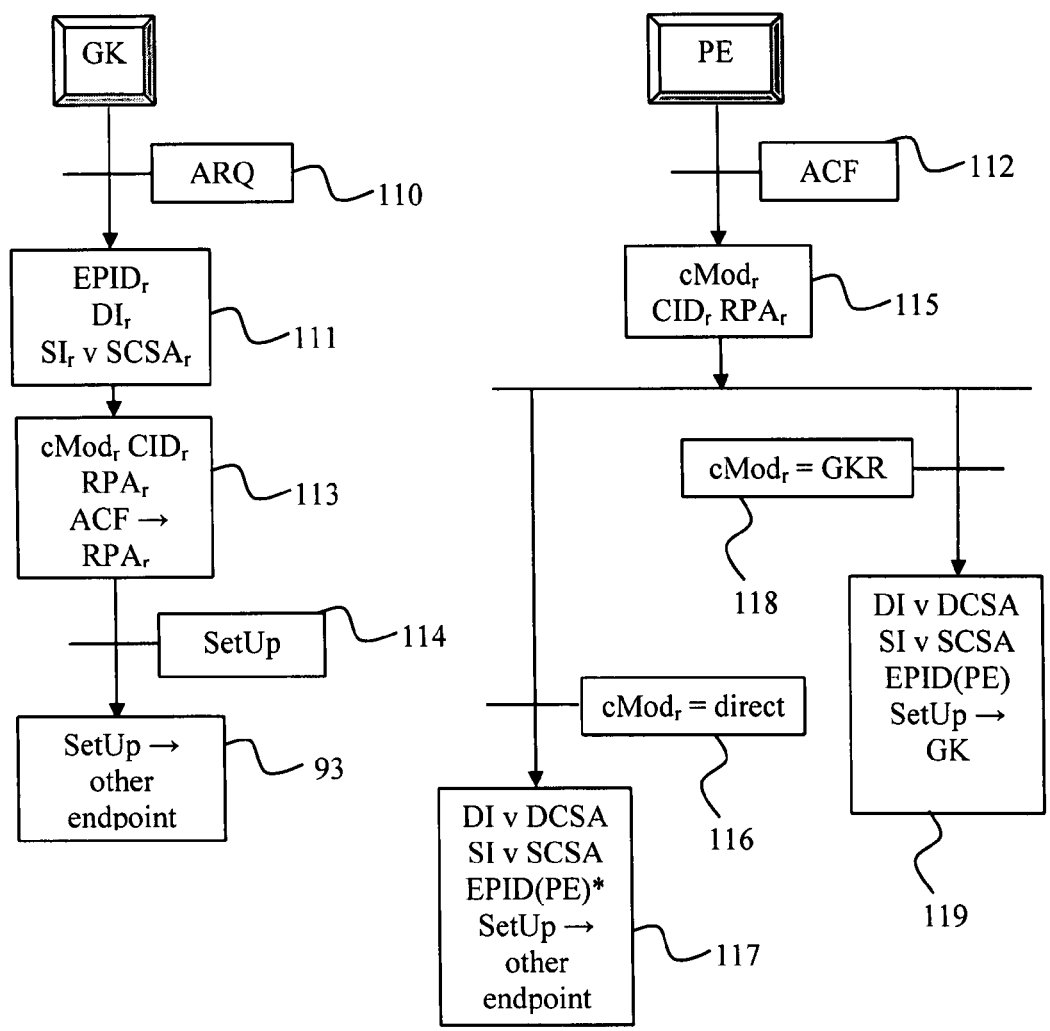
FIG. 15 shows control element and endpoint behaviors for admission and set-up messages.

FIG. 15 shows one example of transitions and steps of an H.323 control element (gatekeeper) and an H.323 endpoint exclusively to illustrate behaviors conforming to Recommendations H.323, H.225 and H.235 for ARQ (Admission ReQuest) messages, Admission ConFirm (ACF) messages, and Admission ReJect (ARJ) messages as well as call set-up (SetUp) messages.

There exist network architectures in which a behavior C22 can be observed wherein, before sending or receiving a call, an endpoint is required to send an ARQ message to the control element with which it is registered. Validating a transition 110, one or more parameter values EPID$_r$, DI$_r$, SI$_r$ or SCSA$_r$ received with the ARQ message enable(s) the control element to identify the endpoint in a step 111. The field SI (Src Info) used for ARQ messages or SA (Source Address) used for SetUp messages is intended to contain one or more aliases identifying a calling endpoint and the field DI (Destination Info) is intended to contain one or more aliases identifying a called endpoint.

If the control element sends an ACF message confirming acceptance of admission in step 113, reception of the ACF message by the calling endpoint validates a transition 112 that activates a step 115 in which the endpoint adopts a behavior C23, conforming to a parameter value cMod (callModel) specified in the ACF message. The "callModel" parameter when set to "direct" validates a transition 116 that activates step 117 in which the endpoint sends the SetUp message directly to the called endpoint. The parameter "callModel" when set to "GKR" (gatekeeperRouted) validates a transition 118 that activates a step 119 in which the endpoint sends the SetUp message to the control element and the control element then forwards it to the called endpoint.

A behavior C24 renders the parameter EPID optional if the SetUp message is sent directly to the endpoint called in step 117 and imposes the parameter EPID if the SetUp message is sent to the control element in step 119.

The individual parameters SI and SCSA of the SetUp message are optional in the H.225 syntax. The parameter SCSA (srcCallSignalAddress) used for ARQ messages or (source-CallSignalAddress) used for SetUp messages indicates a transport address for the signaling channel CS assigned to the calling endpoint. A behavior C25 imposes including at least one of these parameters in the SetUp message sent in step 117 or 119.

The individual parameters DI and DCSA of the SetUp message are optional in the H.225 syntax. The parameter DCSA (dstCallSignalAddress) indicates a transport address for the signaling channel CS assigned to the called endpoint. A behavior C26 imposes including at least one of these parameters in the SetUp message sent in step 117 or 119. If the parameters DI and DCSA were simultaneously present in the setup message, the parameter DI would be preferred over the parameter DCSA for processing the message.

If the SetUp message received by a called endpoint contains the parameter SCSA, a behavior C27 imposes that the value of this parameter be transmitted by the called endpoint in the ARQ message that it sends to the control element.

The routing mode (gatekeeper routed) of the SetUp message is part of a behavior C28 in which the control element can modify the destination information DCSA that it receives before sending the corresponding SetUp message to the called entity in a step 93 activated by a transition 114 validated by reception of the SetUp message from the calling endpoint.

Figure 16:
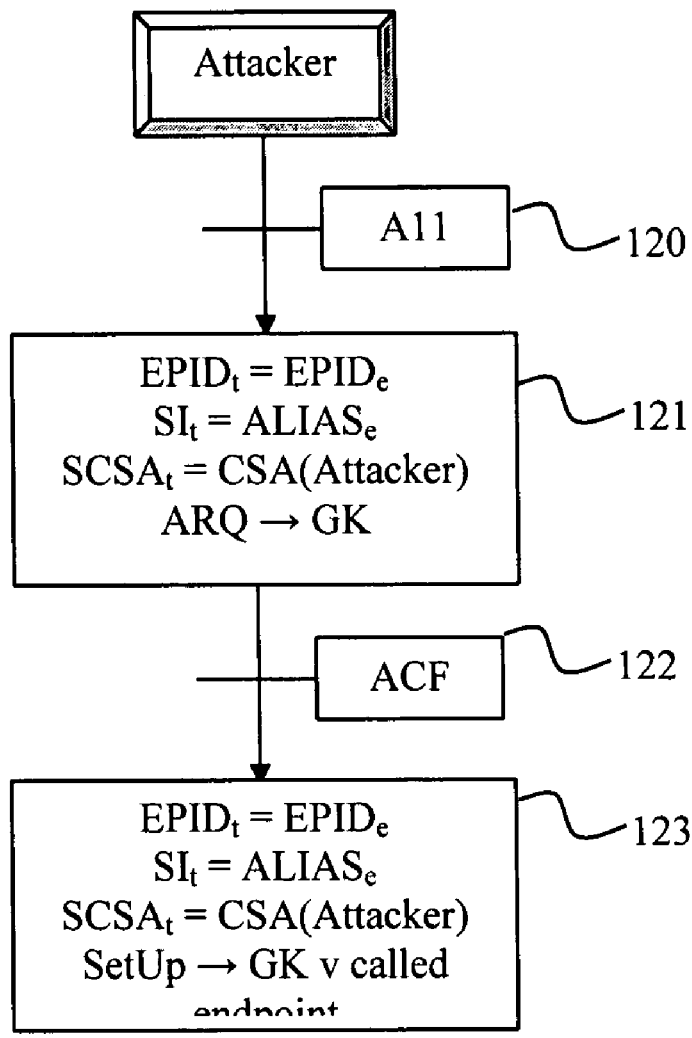
FIGS. 16 to 18 show possible attacks faced with the behaviors shown in FIG. 15.

Referring to FIG. 16, a transition 120 is validated if an attacker decides to mount an attack A11 aimed at sending a call stealing the H.323 identity of a third party entity in a first way. A preliminary phase to the attack A11 acquires the values of the identification parameters EPID and ALIAS of an endpoint registered with the control element. This information can be acquired by one of the attacks A1 to A6 or by any other method leading to the same result. In a step 121 activated by the transition 120, the attacker sends the control element an ARQ message in which the fields EPID and SI are set to the values $EPID_e$ and $ALIAS_e$ previously determined. In the behavior C22, and on the basis of the parameter values $EPID_t$ and $SI_t$, the control element identifies the calling endpoint as valid and returns an ACF message. Depending on the behavior of the control element, the ACF message is returned to the attacker, who validates a transition 122, or to the regular endpoint. To encourage validation of the transition 122, the parameter value $SCSA_t$ of the ARQ message could be forced either to the transport address CSA of the attacker or, if that is not accepted by the control element, to the transport address CSA of the regular endpoint. The attacker then continues the call in a step 123 by sending a SetUp message to the control element or the called endpoint, depending on the call model (cMod) information returned in the ACF message that validates the transition 122. The parameters EPID and SI of the SetUp message retain the information for the stolen identity. Failure to receive an ACF message means that the ACF message was sent to the regular endpoint, and the attacker then sends the SetUp message as indicated above as a function of the call model information known to the attacker. The result of the attack is that it is possible for the attacker to set up a call passing himself off as a third party entity.

Figure 17:
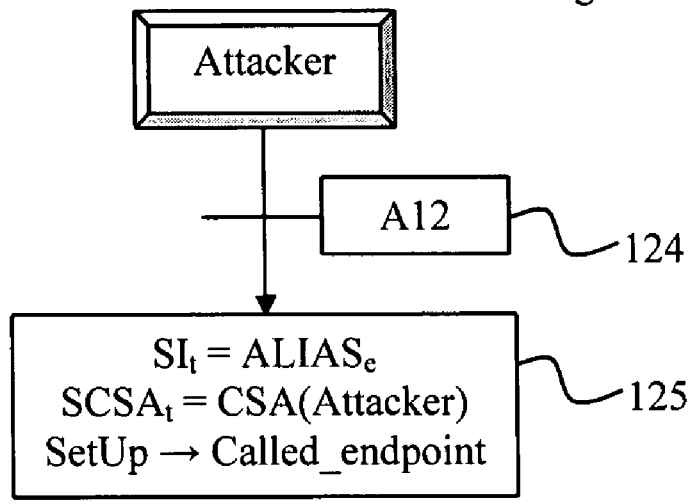

Referring to FIG. 17, a transition 124 is validated if an attacker decides to mount an attack A12 aiming to send a call by stealing the H.323 identity of a third party entity in a second way. A preliminary phase to the attack A12 acquires the values of the identification parameters ALIAS and where applicable EPID of an endpoint registered with the control element. In a step 125 activated by the transition 124, the attacker sends a SetUp message directly to the endpoint that it wishes to call, setting the field SI of the SetUp message to the value $ALIAS_e$ of the entity whose identity it wishes to steal. It should be noted that, in the behavior C24, the field EPID of the setup message is optional. In the behavior C22, the called endpoint will or will not send an ARQ message to the control element before accepting the call. In the former case, the information SI contained in the SetUp message is extracted by the called endpoint and inserted in the ARQ message that it sends to the control element. The ARQ message sent by the called endpoint is logically accepted by the control element and, after reception of the ACF message, call set-up continues normally. It should be noted also that the parameter SCSA of the SetUp message could be omitted or set to the transport address CSA of the attacker, to force the called endpoint to send a response to that address. The result of the attack A12 is that it is possible for the attacker to set up a call passing himself off as a third party entity. This result is in every respect similar to that of the attack A11, only the modus operandi being different.

Figure 18:
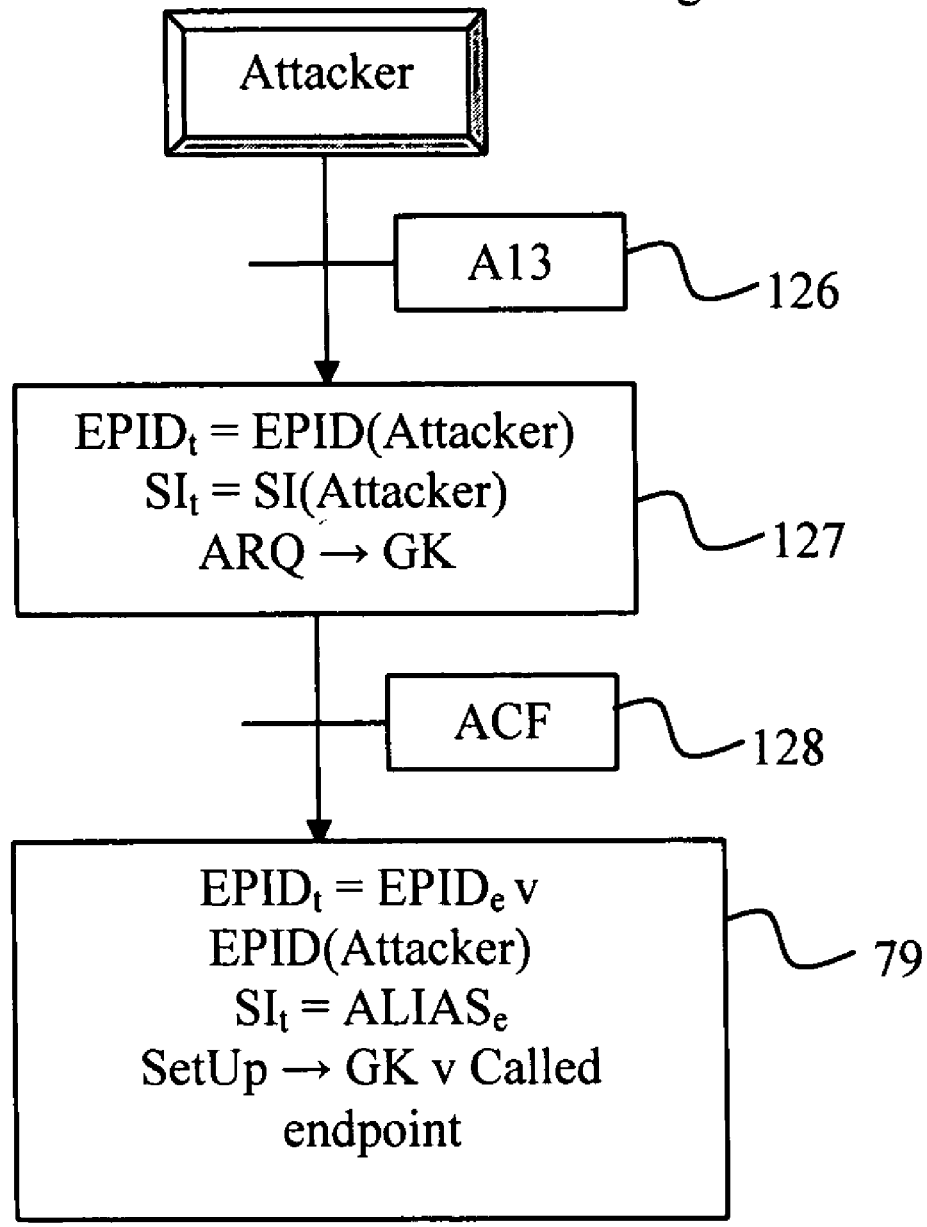

Referring to FIG. 18, a transition 126 is validated if an attacker decides to mount an attack A13 aiming to send a call by stealing the H.323 identity of a third party entity in a third way. A preliminary phase to the attack A13 acquires the values of the identification parameters ALIAS of an endpoint registered with the control element. In a step 127 activated by the transition 126, the attacker sends the control element an ARQ message containing its own parameters EPID and SI, followed in step 79 by a SetUp message to the control element in which the parameter SI is changed to the value $ALIAS_e$ of the third party entity. The step 79 is activated by a transition 128 validated by the reception of an ACF message from the control element, for example. It should be noted that if the call is effected in direct mode, the SetUp message is sent directly to the called entity, which links to the attack A12. The result of the attack A13 is in all respects similar to that of the attacks A11 and A12, only the modus operandi being different. It is to be noted here that the attacker needs to be registered with the control element to have access to the registration parameters EPID and SI. Depending on the system, the attacker can send his own parameter value EPID in the SetUp message or may be constrained to send the parameter value EPID of the regular endpoint.

Experiments conducted on several systems have highlighted systems resistant to certain of the attacks described here but have also detected at least one system vulnerable to each of these attacks even though conforming to the applicable recommendations. Although these attacks are illustrated in an environment which, lacking tokens, does not implement Recommendation H.235, it should be clear that they can be transposed by implementing Recommendation H.235 provided that the H.225 messages contain signaling parameters that are not consistent with the token.

Identifying and studying the attacks described above has yielded the definitions and filtering rules explained next with reference to FIGS. 19 to 24.

Figure 19:
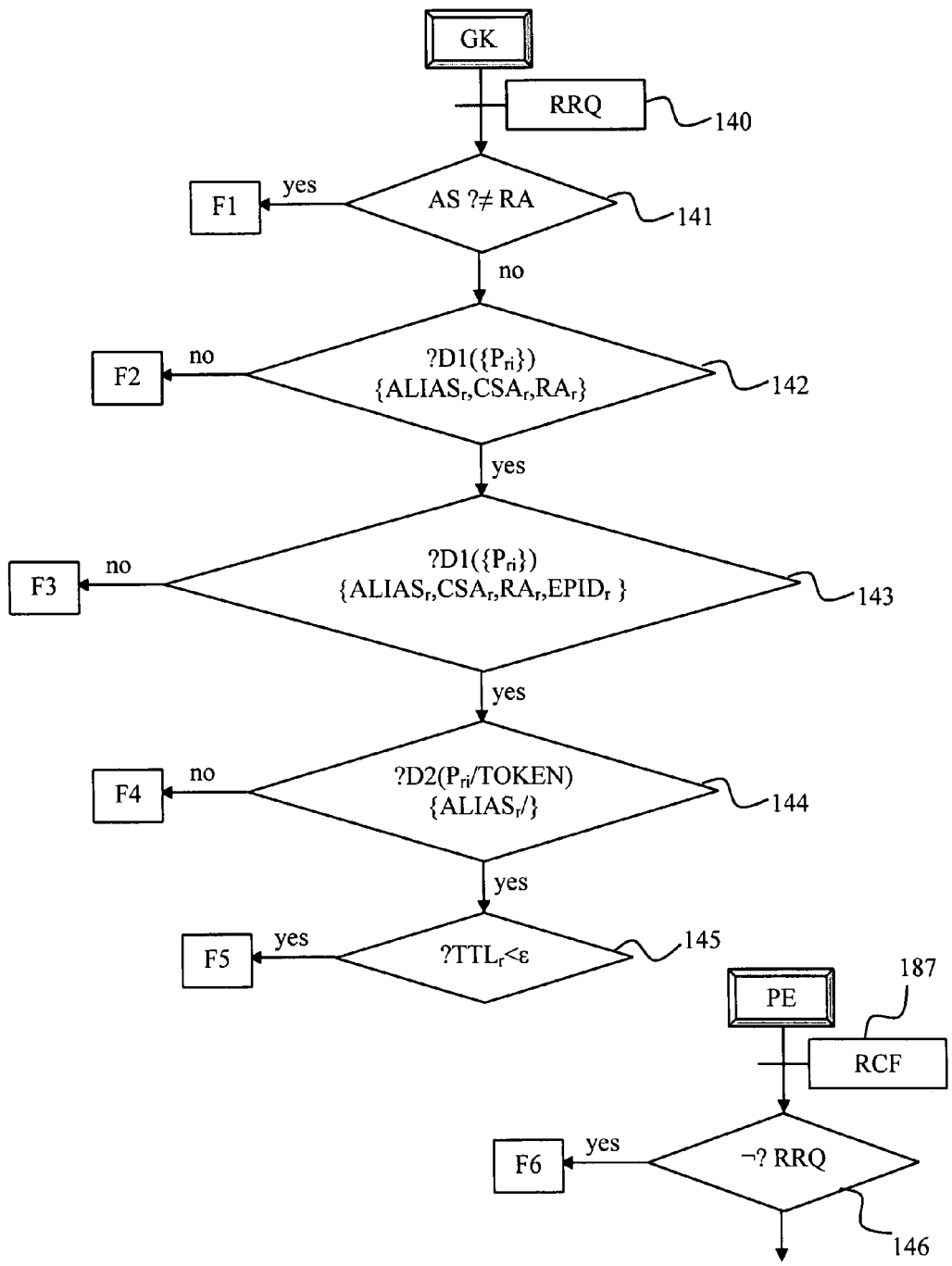
FIG. 19 shows steps of the method relating to registration.

FIG. 19 shows a series of steps 141 to 145 activated when a control element GK is the addressee of a registration request (RRQ) message that validates a transition 140 and a step 146 if an endpoint is the addressee of a registration confirmation (RCF) message that validates a transition 187.

Following validation of the transition 140, an inspection step 141 tests whether the field RA of the RRQ message, which is intended to indicate a transport address to which to send a response to said message, contains a value different from the source address of the message. A positive response to the test indicates detection of a filter condition F1.

An observation step 142 tests whether a set of received values $ALIAS_r$, $CSA_r$, $RA_r$ corresponds to a set of transmitted parameters $P_{ri}$ consistent with the current state of the control element. The test uses a consistency function D1 executed from a step 147 with the received parameter values. A negative response to the test indicates detection of a filter condition F2.

Figure 20:
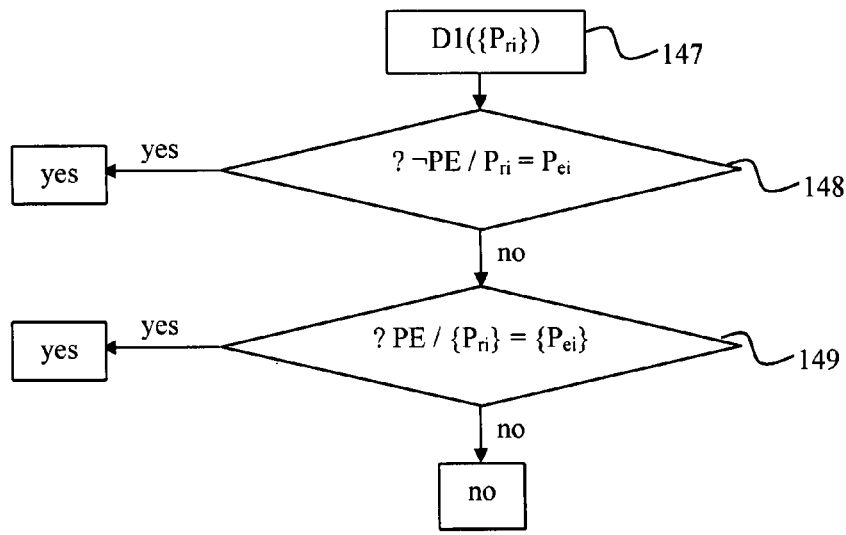
FIG. 20 shows an observation step of detecting inconsistent parameters.

Referring to FIG. 20, steps 148 and 149 are activated from the step 147.

For each parameter $P_{ri}$, the step 148 tests whether there exists in the control element an endpoint PE that is already registered and that has a parameter $P_{ei}$ of the same type and the same value as the parameter $P_{ri}$.

For all the parameters $P_{ri}$, the step 149 tests whether there exists in the control element a unique endpoint PE already registered and having a set of as many parameters $P_{ei}$ of the same types and the same values as the set of parameters $P_{ri}$.

The function D1 returns a positive test response for a positive response to either of the two tests of steps 148 and 149.

Referring to FIG. 19, if a value $EPID_r$ is transmitted, an observation step 143 tests whether a set of received values $ALIAS_r$, $CSA_r$, $RA_r$, $EPID_r$ corresponds to a set of transmitted parameters $P_{ri}$ consistent with the current state of the control element. The test uses the consistency function D1 executed from the step 147 with the received parameter values. A negative response to the test indicates the detection of a filter condition F3.

An authorization step 144 tests whether an ALIAS/TOKEN association is authorized by invoking a consistency function D2 described with reference to FIG. 21. A negative response from the function D2 indicates detection of a filter condition F4.

Figure 21:
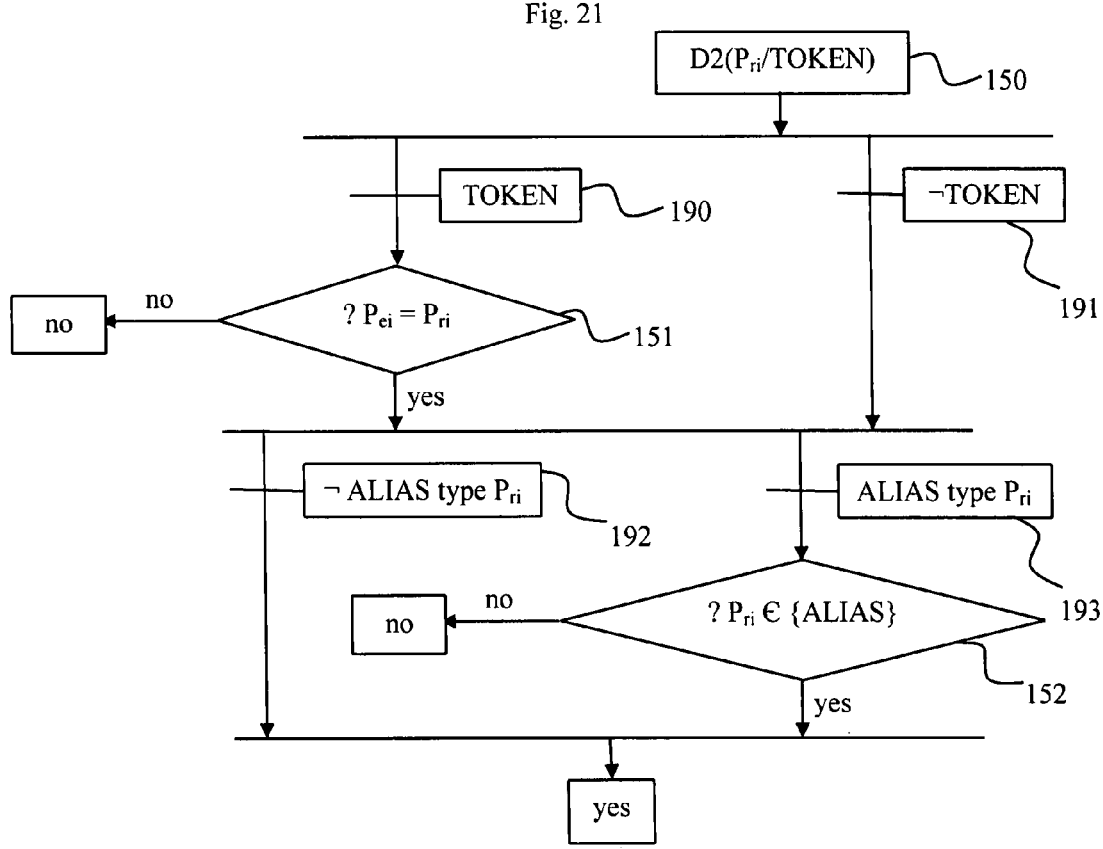
FIG. 21 shows an authorization step of detecting unauthorized parameters.

Referring to FIG. 21, the function D2 receives in step 150 the designation of a parameter/token association the consistency of which is to be verified. For example, if the function D2 is invoked from the step 144, the designation corresponds to a parameter value $P_{ri}$ equal to the value $ALIAS_r$ and to a token value equal to the value $TOKEN_r$ if it is transmitted in the received H.225 message. Two conditions are necessary for verification of the authorization.

A transition 190 is validated if the value of the token is transmitted in the received message and a transition 191 is validated if the value of the token is not transmitted in the received message. The token, in the sense of Recommendation H.235 is a secret key provided for accrediting an associated parameter value, for example.

The transition 190 activates a step 151 that tests whether the endpoint that the token identifies has an attribute $P_{ei}$ of the same type and the same value as $P_{ri}$. The first condition is satisfied by a positive response to the test of the step 151 or by validation of the transition 191.

A transition 192 is validated if the associated parameter is not of the endpoint identifier ALIAS type and a transition 193 is validated if the associated parameter is of the endpoint identifier ALIAS type.

The transition 193 activates a step 152 that tests whether the value of the parameter $P_{ri}$ is in the ALIAS range supplied by the operator. An ALIAS is supplied when it is reserved by the operator to a given endpoint, whether that endpoint is already registered with the control element or not. The second condition is satisfied by a positive response to the test of the step 152 or by validation of the transition 192.

The function D2 returns a negative test response for a negative response to one of the two tests of the steps 151 and 152.

For the consistency function D1 or the consistency function D2, if a parameter $P_{ri}$ is of the source address (AS) type, that parameter is similar to a parameter of the RAS Address (RA) type with a value equal to that of the source address designated by $P_{ri}$.

Referring to FIG. 19, an evaluation step tests whether the RRQ message contains a received registration validity period type parameter with a value $TTL_r$ less than a threshold of value $\epsilon$ predefined by the operator. The value $\epsilon$ would typically be less than the registration period applied by default in the network, and of the order of a few seconds. The value of this threshold can vary depending on the architecture and equipments deployed by the network operator. It is nevertheless recommended that a value of 60 seconds for $\epsilon$ should not be exceeded. A positive response to the test indicates detection of a filter condition F5.

Following validation of the transition 187, a surveillance step 146 tests whether the RCF message received by the regular endpoint from the control element (gatekeeper) with which it is registered does not follow an RRQ message previously sent by that endpoint. A positive response to the test indicates detection of a filter condition F6.

Figure 22:
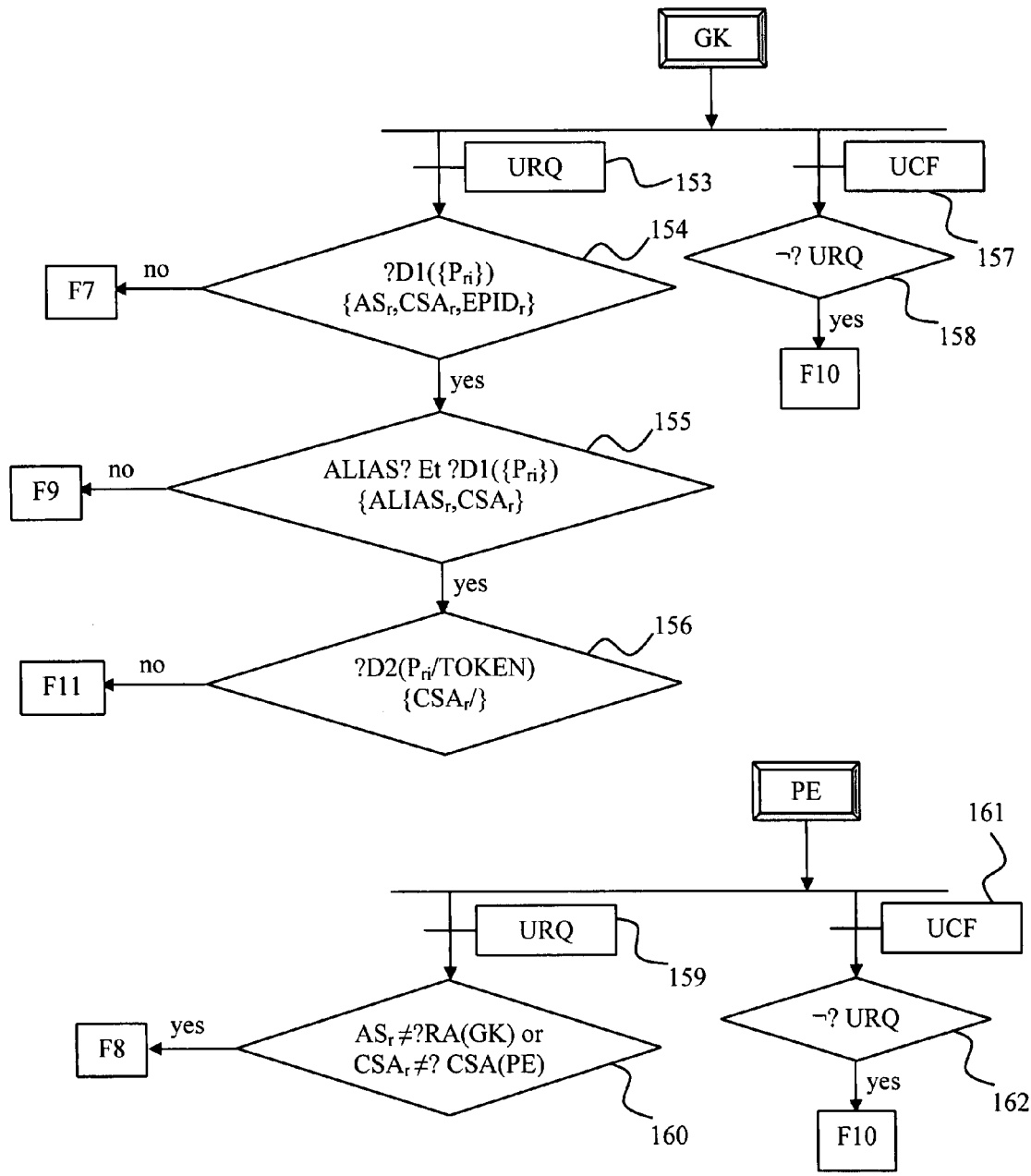
FIG. 22 shows steps of the method steps relating to unregistration.

Referring to FIG. 22, a URQ message received by a control element (gatekeeper) validates a transition 153 that activates steps 154 to 156.

The step 154 tests whether a set of received values $AS_r$, $CSA_r$, $EPID_r$ corresponds to a set of transmitted parameters $P_{ri}$ consistent with the current state of the control element by invoking the consistency function D1 executed from the step 147 with the received parameter values. A negative response to the test indicates detection of a filter condition F7.

The step 155 tests whether the URQ message contains a parameter ALIAS and if a set of received values $ALIAS_r$, $CSA_r$ responds to a set of transmitted parameters $P_{ri}$ consistent with the current state of the control element by invoking the consistency function D1 executed from the step 147 with the received parameter values. A negative response to the test indicates detection of a filter condition F9.

The step 156 tests whether a CSA/TOKEN association is authorized by invoking the function D2 described with reference to FIG. 21. A negative response from the function D2 indicates detection of a filter condition F11.

A URQ message received by an endpoint validates a transition 159 that activates a step 160 which tests whether the source address AS is different from the transport address used for the channel RAS of the control element with which the endpoint is registered or if the parameter CSA is not consistent because it is different from the transport address of the channel CS of the endpoint. A positive response to the test indicates detection of a filter condition F8.

A UCF message received by the control element or the endpoint respectively validates a transition 157 or 161 that respectively activates a surveillance step 158 or 162 that tests whether the message corresponds to a URQ message sent previously to the network element from which the UCF message originates. A positive response to the test indicates detection of a filter condition F10.

Figure 23:
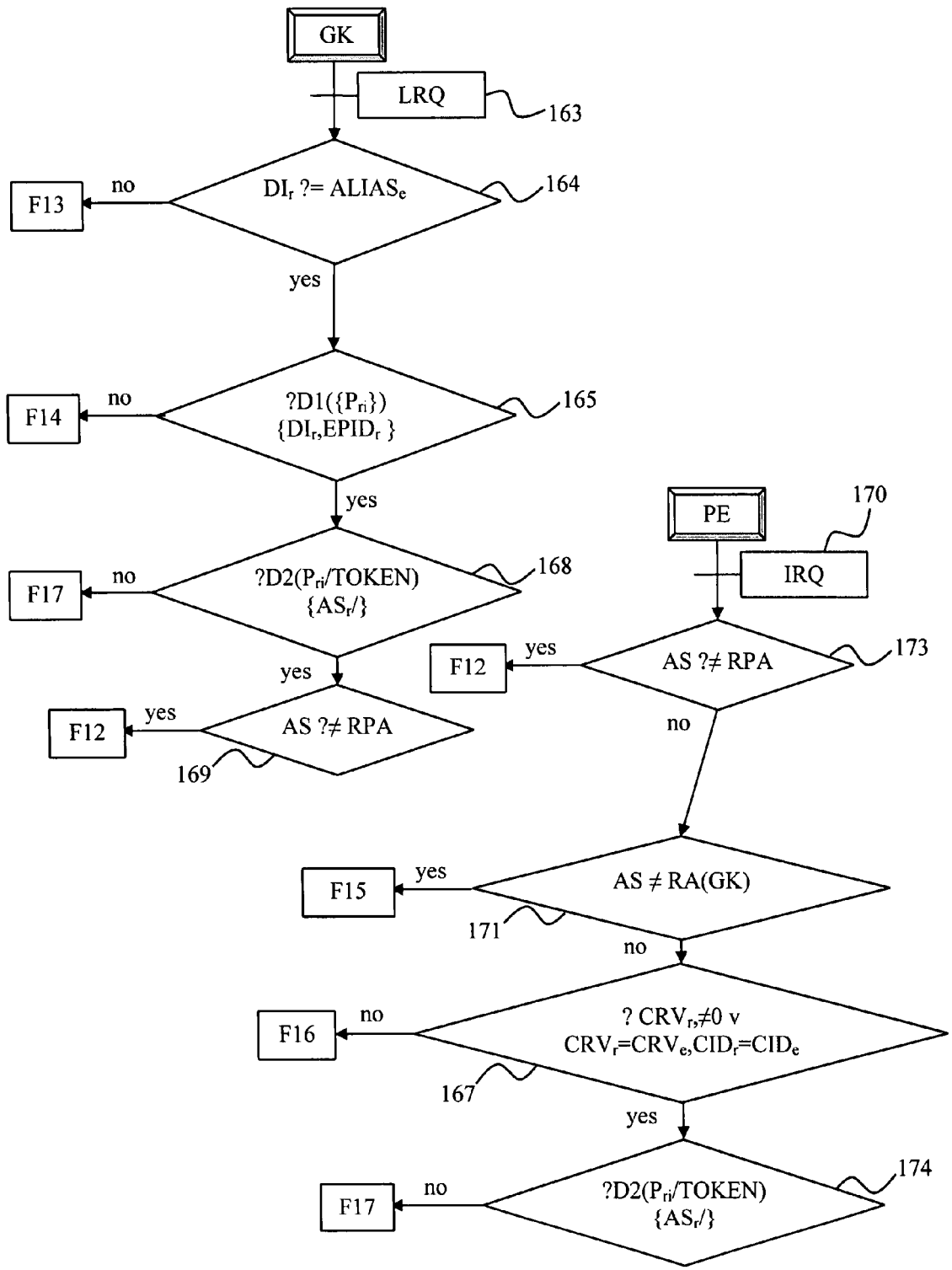
FIG. 23 shows steps of the method relating to location and information.

Referring to FIG. 23, inspection steps 169, 173 test whether the field RPA of an LRQ or IRQ message, intended to indicate a transport address to which to send a response to said message, contains a value different from the source address of the message. A positive response to the test indicates detection of a filter condition F12. A LRQ message to the control element validates a transition 163. An IRQ message to the endpoint validates a transition 170. The step 169 is activated by the validation of the transition 163. The step 173 is activated by the validation of the transition 170.

The transition 163 activates an observation step 164 that tests the consistency of the parameter DI of the LRQ message serving as an identifier that is registered with a value $ALIAS_e$ with the control element that received the LRQ message. A negative response to the test indicates detection of a filter condition F13.

The transition 163 activates an observation step 165 invoking the function D1 and submitting to it the set of parameters {DI, EPID}. A negative response to the test indicates detection of a filter condition F14.

The transition 170 activates an observation step 171 in which a current state of the endpoint includes the transport address RA(GK) of the control element with which the endpoint is registered. The source address of the IRQ message is a parameter that is consistent if its value is equal to the address RA(GK). The function of the step 171 is to detect an inconsistency that then constitutes a filter condition F15.

The transition 170 activates an observation step 167 that, if the IRQ message transmits a non-zero parameter CRV, tests whether a set of received values $CRV_r$, $CID_r$ corresponds to a set of transmitted parameters $P_{rt}$ consistent with the current state of the endpoint. The received values are consistent if they correspond to the call in progress. A negative response to the test indicates detection of a filter condition F16.

The transition 163 and the transition 170 respectively activate the authorization step 168 and the authorization step 174 that test whether the AS/TOKEN association is authorized by invoking the function D2. For this test, the source address AS is treated as if it were an address RA with the same value. A negative response to a test indicates detection of a filter condition F17.

Figure 24:
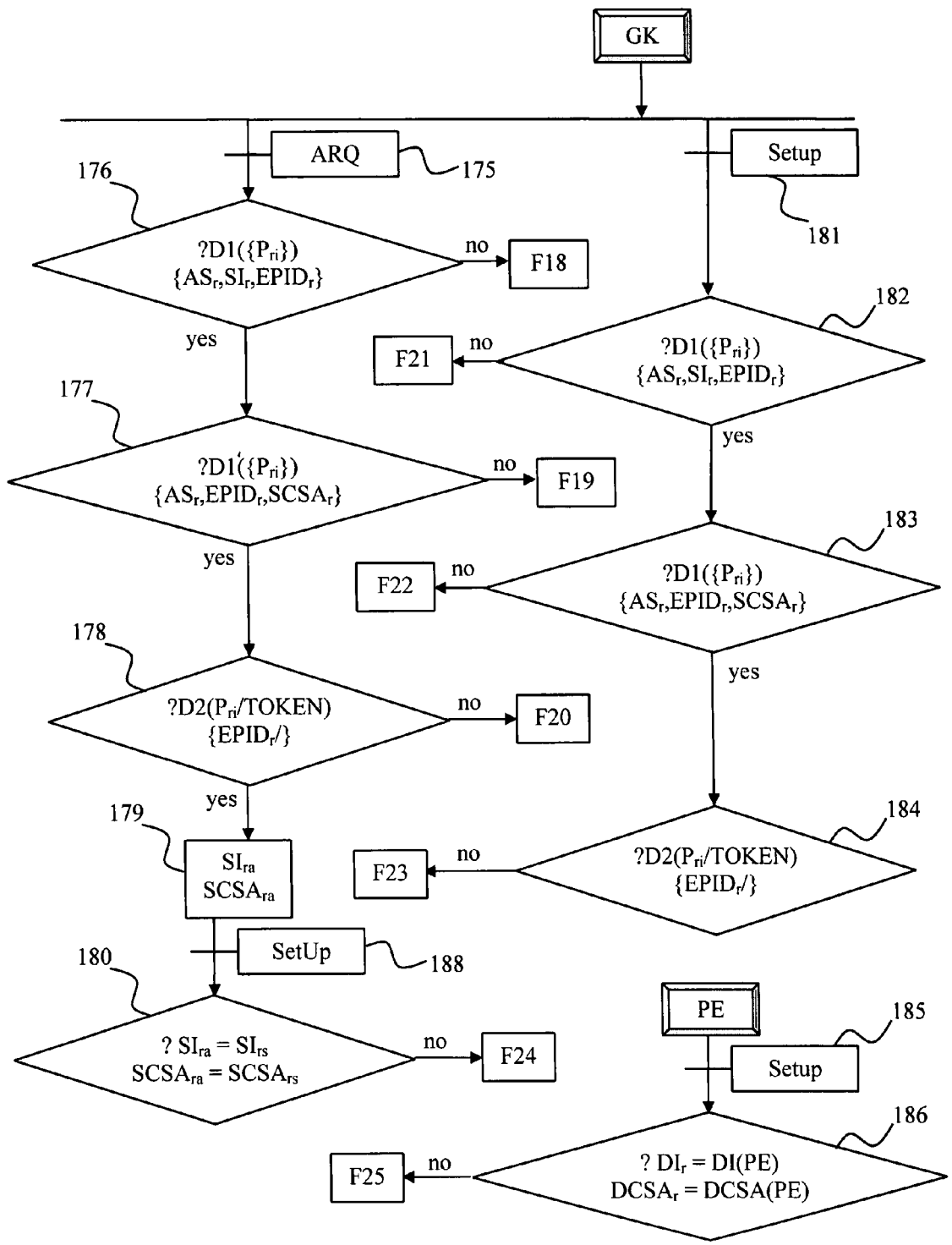
FIG. 24 shows steps of the method relating to admission and set-up.

Referring to FIG. 24, an ARQ message and a SetUp message to the control element respectively validate a transition 175 and a transition 181. A succession of ARQ, SetUp messages to the control element validates a transition 188. A message to an endpoint validates a transition 185.

If the ARQ message contains a field SI, the transition 175 activates an observation step 176 that tests whether a set of received values $AS_r$, $SI_r$, $EPID_r$ corresponds to a set of transmitted parameters $P_{rt}$ consistent with the current state of the control element by invoking the consistency function D1 executed from the step 147 with the received parameter values. A negative response to the test indicates detection of a filter condition F18.

If the SetUp message contains a field SI, the transition 181 activates an observation step 182 that tests whether a set of received values $AS_r$, $SI_r$, $EPID_r$ that corresponds to a set of transmitted parameter $P_{rt}$ is consistent with the current state of the control element by invoking the consistency function D1 executed from the step 147 with the received parameter values. A negative response to the test indicates detection of a filter condition F21.

If the ARQ message contains a field SCSA, the transition 175 activates an observation step 177 that tests whether a set of received values $SCSA_r$, $AS_r$, $EPID_r$ that corresponds to a set of transmitted parameters $P_{rt}$ is consistent with the current state of the control element by invoking the consistency function D1 executed from the step 147 with the received parameter values. A negative response to the test indicates detection of a filter condition F19.

If the setup message contains a field SCSA, the transition 181 activates an observation step 183 that tests whether a set of received values $SCSA_r$, $AS_r$, $EPID_r$ that corresponds to a set of transmitted parameter $P_{rt}$ is consistent with the current state of the control element by invoking the consistency function D1 executed from the step 147 with the received parameter values. A negative response to the test indicates detection of a filter condition F22.

The transition 175 activates a step 178 that tests whether an association EPID/TOKEN is authorized by invoking the consistency function D2 described with reference to FIG. 21. A negative response from the function D2 indicates detection of a filter condition F20.

The transition 181 activates a step 184 that tests whether an association EPID/TOKEN is authorized by invoking the consistency function D2 described with reference to FIG. 21. A negative response from the function D2 indicates detection of a filter condition F23.

The transition 175 activates a step 179 that stores the values of fields $SI_{ra}$, $SCSA_{ra}$ received with the ARQ message. Following the step 179, reception by the control element of a message on the signaling channel CS coming from the same endpoint as the ARQ message validates a transition 188.

The transition 188 activates an observation step 180 in which a current state of the control element comprises the values stored in step 179. The step 180 tests whether the values $SI_{rs}$, $SCSA_{rs}$ received with the second (SetUp) message are equal to those of the first (ARQ) message. A negative response to the test indicates detection of a filter condition F24.

The transition 185 activates an observation step 186 in which a current state of the endpoint comprises the identifier value DI(PE) and transport address value DCSA(PE) known to the endpoint. The step 185 tests whether the values $DI_r$, $DCSA_r$ received with the SetUp message are equal to the respective known values. A negative response to the test indicates detection of a filter condition F25.

The tests of the method described with reference to FIGS. 19 to 24 make the network secure against numerous attacks.

For example, at the time of an attack A1, the step 41 can be filtered by the step 142, or even by the step 143, because the address CSA of the attacker does not correspond to the address CSA of the attacked entity. During an attack A2, the step 47 can be filtered by the step 142 because the address RA does not correspond to the address RA of the attacked entity. During an attack A3, the step 53 can be filtered by the step 142 because the endpoint identifier is not consistent with the call signaling channel transport address. At the time of an attack A6, the step 67 can be filtered by the step 142 if the RA address is that of the attacker; if this is not so, the endpoint can respond to the attack using the step 146.

The invention claimed is:

1. A method of making an audiovisual communications network secure, in which network a first endpoint exchanges with a control element messages transmitting parameters registered or to be registered with the control element to enable the first endpoint to communicate with a second endpoint registered with the control element, which method comprises:
  detecting whether a set of parameters among the parameters transmitted in a message is inconsistent with endpoint parameters stored by the addressee of said message, wherein said set of parameters comprises at least two parameters, one of said parameters being a source address type parameter, and
  detecting an attack when the set of parameters is inconsistent,
  wherein, the control element is the addressee of the message, and:
  the set of transmitted parameters is consistent if each parameter of the set does not correspond to any endpoint parameter of identical type and value registered with the control element; or
  the set of transmitted parameters is consistent if there exists a set including the same number of parameters of respectively identical types and values for a single endpoint already registered with the control element.

2. The method according to claim 1, further comprising detecting, for a transmitted parameter that can be associated with a token:
  when a transmitted token exists, whether the transmitted parameter is not of identical type and value to the type and value of an endpoint attribute accredited by the token; and
  when the transmitted parameter is of an endpoint identifier type, whether the value of said parameter is not in a range of identifier values supplied for the endpoint.

3. The method according to claim 1, wherein, when a parameter from the set of transmitted parameters is of a source address type, said parameter is similar to a parameter of a transport address type for a channel RAS with the same value.

4. The method according to claim 1, wherein, when the message is of a type requesting registration with the control element, the set of parameters that must be consistent includes a parameter of an identifier type, a parameter of a signaling channel transport address type, and a parameter of an RAS channel transport address type.

5. The method according to claim 4, wherein the set that is to be consistent additionally includes an endpoint registration identity key, if said key is present in said message.

6. The method according to claim 1, further comprising detecting, when the message contains a parameter of a registration validity period type, whether said parameter has a value less than a threshold predefined by an operator of the network.

7. The method according to claim 1, further comprising detecting whether a registration or unregistration confirmation type message received by the addressee is not preceded by a registration or unregistration request type message, respectively, sent by said addressee.

8. The method according to claim 3, wherein, when the message is of a type requesting unregistration from the control element, the set of parameters that is to be consistent includes a signaling channel transport address type parameter, a source address and an endpoint registration identity key.

9. The method according to claim 1, wherein, when the message is of a type requesting unregistration from the control element, the set of parameters that is to be consistent includes a signaling channel transport address type parameter and an endpoint identifier type parameter if said identifier is present in said message.

10. The method according to claim 2, wherein, when the message is of a type requesting unregistration from the control element, the transmitted parameter that can be associated with a token is a signaling channel transport address type parameter.

11. The method according to claim 1, wherein, when the message is of a location request type, the set of transmitted parameters includes a destination identifier type parameter which, to be consistent, must have a value equal to that of a registered endpoint identifier.

12. The method according to claim 11, wherein the set that is to be consistent additionally includes an endpoint registration identity key type parameter if said key is present in said message.

13. The method according to claim 1, wherein, when the message is of an information request type, the set of parameters that is to be consistent includes a non-zero call reference type parameter and a call identifier type parameter.

14. The method according to claim 1, wherein, when the addressee is an endpoint and the message is of an information request type, the set of parameters that is to be consistent includes a source address of the sender that must be equal to the source address of the control element with which the endpoint is registered.

15. The method according to claim 3, further comprising detecting, for a transmitted parameter that can be associated with a token:
  when a transmitted token exists, whether the transmitted parameter is not of identical type and value to the type and value of an endpoint attribute accredited by the token; and
  when the transmitted parameter is of an endpoint identifier type, whether the value of said parameter is not in a range of identifier values supplied for the endpoint,
  wherein, when the message is of a location request or information request type, the parameter transmitted in association with the token parameter is a source address type parameter.

16. The method according to claim 1, wherein, when the message is of an admission request type, the set of parameters that is to be consistent includes a source address type parameter, a calling endpoint identifier type parameter, and an endpoint registration identity key.

17. The method according to claim 1, wherein, when the message is of an admission request type, the set that must be consistent includes a source address type parameter, a call signaling channel transport address type parameter used by the calling endpoint, and an endpoint registration identity key.

18. The method according to claim 2, wherein, when the message is of an admission request type or call set-up type, the transmitted parameter that can be associated with the token parameter is an endpoint registration identity key type parameter.

19. The method according to claim 1, wherein, when the message is of a call set-up type, the set of parameters that is to be consistent includes a source address type parameter, a calling endpoint identifier type parameter, and an endpoint registration identity key if the calling endpoint identifier is present in said message.

20. The method according to claim 1, wherein, when the message is of a call set-up type, the set of parameters that is to be consistent includes a source address type parameter, a signaling channel transport address type parameter used by the calling endpoint, and an endpoint registration identity key if said signaling channel transport address is present in said message.

21. The method according to claim 3, wherein, when the message is of a registration request type, the parameter transmitted in association with the token parameter is an endpoint identifier type parameter.

22. The method according to claim 1, further comprising, when the message is of a call set-up type preceded by an admission request type message, detecting whether the call set-up type message includes an identifier or calling endpoint signaling channel transport address type parameter with a value different from that transmitted by the admission request type message.

23. The method according to claim 1, wherein, when the addressee is an endpoint and the message is of a call set-up type, the set of parameters that is to be consistent includes an identifier or transport address type parameter designating the called endpoint.

24. The method according to claim 1, wherein, when the addressee is an endpoint and the message is of an unregistration request type, the set of parameters that is to be consistent includes a call signaling channel transport address type parameter and a source address to which there corresponds a state of the addressee including the call signaling channel transport address used by the addressee and the RAS channel transport address used by the control element with which the addressee is registered.

25. The method according to claim 1, including an inspection step for detecting whether a source address of the message has a value different from a parameter value contained in the message to indicate a transport address to which to send a response to said message.

* * * * *